United States Patent
Qin et al.

(10) Patent No.: US 11,727,799 B2
(45) Date of Patent: Aug. 15, 2023

(54) AUTOMATICALLY PERCEIVING TRAVEL SIGNALS

(71) Applicant: Motional AD LLC, Boston, MA (US)

(72) Inventors: Baoxing Qin, Singapore (SG); Aravindkumar Vijayalingam, Singapore (SG)

(73) Assignee: Motional AD LLC, Boston, MA (US)

( * ) Notice: Subject to any disclaimer, the term of this patent is extended or adjusted under 35 U.S.C. 154(b) by 0 days.

(21) Appl. No.: 17/531,908

(22) Filed: Nov. 22, 2021

(65) Prior Publication Data

US 2022/0230449 A1 Jul. 21, 2022

Related U.S. Application Data

(63) Continuation of application No. 16/863,857, filed on Apr. 30, 2020, now Pat. No. 11,182,628, which is a
(Continued)

(51) Int. Cl.
| | |
|---|---|
| *G06K 9/00* | (2022.01) |
| *G08G 1/0962* | (2006.01) |
| *B60W 30/00* | (2006.01) |
| *G06V 20/58* | (2022.01) |
| *G06V 10/44* | (2022.01) |
| *G06V 10/56* | (2022.01) |

(Continued)

(52) U.S. Cl.
CPC ......... *G08G 1/09623* (2013.01); *B60W 30/00* (2013.01); *G06F 18/22* (2023.01); *G06F 18/24155* (2023.01); *G06V 10/44* (2022.01); *G06V 10/469* (2022.01); *G06V 10/56* (2022.01); *G06V 10/761* (2022.01); *G06V 10/764* (2022.01); *G06V 20/582* (2022.01); *G08G 1/09626* (2013.01)

(58) Field of Classification Search
CPC .... G06V 20/582; G06V 10/44; G06V 10/469; G06V 10/56; B60W 30/00; G06K 9/6215; G06K 9/6278; G08G 1/09623; G08G 1/09626
USPC ........................................................ 382/104
See application file for complete search history.

(56) References Cited

U.S. PATENT DOCUMENTS

| | | | |
|---|---|---|---|
| 5,945,927 | A | 8/1999 | Nakayama et al. |
| 9,092,695 | B1 | 4/2015 | Ogaie |

(Continued)

FOREIGN PATENT DOCUMENTS

| | | |
|---|---|---|
| CN | 102765365 | 11/2012 |
| CN | 103770733 | 5/2014 |

(Continued)

OTHER PUBLICATIONS

De Charette et al., "Real time visual traffic lights recognition based on spot light detection and adaptive traffic lights templates." Intelligent Vehicles Symposium, 2009 IEEE Jun. 3, 2009, pp. 358-363.
(Continued)

*Primary Examiner* — Jonathan S Lee
(74) *Attorney, Agent, or Firm* — Fish & Richardson P.C.

(57) ABSTRACT

Among other things, one or more travel signals are identified by analyzing one or more images and data from sensors, classifying candidate travel signals into zero, one or more true and relevant travel signals, and estimating a signal state of the classified travel signals.

20 Claims, 17 Drawing Sheets

Related U.S. Application Data continuation of application No. 15/490,616, filed on Apr. 18, 2017, now Pat. No. 10,643,084.

(51) Int. Cl.
*G06V 10/46* (2022.01)
*G06F 18/22* (2023.01)
*G06F 18/2415* (2023.01)
*G06V 10/74* (2022.01)
*G06V 10/764* (2022.01)

(56) References Cited

U.S. PATENT DOCUMENTS

| | | |
|---|---|---|
| 9,070,305 B1 | 6/2015 | Raman et al. |
| 9,164,511 B1 | 10/2015 | Ferguson et al. |
| 9,261,881 B1 | 2/2016 | Ferguson et al. |
| 9,550,498 B2 | 1/2017 | Meyer et al. |
| 9,551,867 B1 | 1/2017 | Grabowski et al. |
| 9,701,239 B2 | 7/2017 | Kentley et al. |
| 9,764,736 B2 | 9/2017 | Prokhorov |
| 9,840,003 B2 | 12/2017 | Szatmary et al. |
| 9,898,668 B2 | 2/2018 | Ren et al. |
| 10,106,156 B1 | 10/2018 | Nave et al. |
| 10,139,832 B2* | 11/2018 | Sarkar ............... G05D 1/0274 |
| 10,643,084 B2 | 5/2020 | Qin et al. |
| 10,650,256 B2 | 5/2020 | Qin et al. |
| 10,960,886 B2 | 3/2021 | Pendleton et al. |
| 11,182,628 B2 | 11/2021 | Qin et al. |
| 11,529,955 B2 | 12/2022 | Pendleton et al. |
| 2003/0112132 A1 | 6/2003 | Trajkovic et al. |
| 2005/0105771 A1 | 5/2005 | Nagai et al. |
| 2006/0034484 A1 | 2/2006 | Bahlmann |
| 2009/0051568 A1 | 2/2009 | Corry |
| 2009/0074249 A1 | 3/2009 | Moed |
| 2009/0092334 A1 | 4/2009 | Shulman et al. |
| 2009/0174573 A1 | 7/2009 | Smith |
| 2009/0254235 A1 | 10/2009 | Kuroda |
| 2010/0104199 A1 | 4/2010 | Zhang et al. |
| 2010/0232709 A1 | 9/2010 | Zhang et al. |
| 2010/0278079 A1 | 11/2010 | Meyer et al. |
| 2011/0224893 A1 | 9/2011 | Scofield et al. |
| 2012/0045119 A1 | 2/2012 | Schamp |
| 2012/0106645 A1 | 5/2012 | Lin et al. |
| 2012/0130629 A1 | 5/2012 | Kim |
| 2012/0189410 A1 | 7/2012 | Toebes et al. |
| 2013/0077830 A1 | 3/2013 | Liu |
| 2013/0211682 A1 | 8/2013 | Joshi et al. |
| 2013/0325241 A1 | 12/2013 | Lombrozo et al. |
| 2014/0204209 A1 | 7/2014 | Huth et al. |
| 2014/0277901 A1 | 9/2014 | Ferguson et al. |
| 2014/0343842 A1 | 11/2014 | Ranganathan |
| 2015/0100158 A1 | 4/2015 | Tanigawa et al. |
| 2015/0329107 A1 | 11/2015 | Meyer et al. |
| 2016/0140729 A1 | 5/2016 | Soatto et al. |
| 2016/0148063 A1 | 5/2016 | Hong et al. |
| 2016/0167226 A1 | 6/2016 | Schnittman |
| 2017/0072962 A1 | 3/2017 | Meyer et al. |
| 2017/0110010 A1 | 4/2017 | Grabs et al. |
| 2017/0160743 A1* | 6/2017 | Schweikl ............... B60W 30/00 |
| 2017/0221366 A1 | 8/2017 | An et al. |
| 2017/0227970 A1 | 8/2017 | Taguchi et al. |
| 2017/0262709 A1 | 9/2017 | Wellington et al. |
| 2018/0032082 A1 | 2/2018 | Shalev-Shwartz et al. |
| 2018/0112997 A1* | 4/2018 | Fasola ............... G06V 20/584 |
| 2018/0122227 A1 | 5/2018 | Mubarek |
| 2018/0144202 A1 | 5/2018 | Moosaei et al. |
| 2018/0165822 A1 | 6/2018 | Uliyar et al. |
| 2018/0173237 A1 | 6/2018 | Reiley et al. |
| 2018/0181884 A1 | 6/2018 | Rolle et al. |
| 2018/0225965 A1 | 8/2018 | MacNeille |
| 2018/0253968 A1 | 9/2018 | Yalla |
| 2018/0259968 A1 | 9/2018 | Frazzoli et al. |
| 2018/0286227 A1* | 10/2018 | Sorgatz ............... G08G 1/0112 |
| 2018/0299893 A1 | 10/2018 | Qin et al. |
| 2018/0300565 A1 | 10/2018 | Qin et al. |
| 2018/0300566 A1 | 10/2018 | Qin et al. |
| 2018/0300567 A1 | 10/2018 | Qin et al. |
| 2019/0025825 A1 | 1/2019 | Takahama |
| 2019/0050648 A1 | 2/2019 | Stojanovic et al. |
| 2019/0278273 A1 | 9/2019 | Behrendt et al. |
| 2019/0291729 A1 | 9/2019 | Kamiya et al. |
| 2020/0026284 A1 | 1/2020 | Hiramatsu et al. |
| 2020/0026960 A1 | 1/2020 | Park et al. |
| 2020/0086863 A1 | 3/2020 | Rosman et al. |
| 2020/0098269 A1 | 3/2020 | Wray et al. |
| 2020/0130683 A1 | 4/2020 | Oguri et al. |
| 2020/0139944 A1 | 5/2020 | Kamiya et al. |
| 2020/0160699 A1 | 5/2020 | Annapureddy et al. |
| 2020/0238996 A1 | 7/2020 | Pendleton et al. |
| 2020/0257911 A1 | 8/2020 | Qin et al. |
| 2020/0262422 A1 | 8/2020 | Kamiya et al. |
| 2020/0293064 A1 | 9/2020 | Wu et al. |
| 2020/0334861 A1 | 10/2020 | Jin et al. |
| 2021/0064890 A1 | 3/2021 | Marveit et al. |
| 2021/0284161 A1 | 9/2021 | Pendleton et al. |

FOREIGN PATENT DOCUMENTS

| | | |
|---|---|---|
| CN | 105976402 | 9/2016 |
| CN | 107599965 | 1/2018 |
| EP | 3428026 | 1/2019 |
| KR | 10-1029096 | 4/2011 |
| KR | 10-1614677 | 4/2016 |
| WO | WO 2013180787 | 12/2013 |
| WO | WO 2015/116950 | 8/2015 |
| WO | WO 2016020718 | 2/2016 |
| WO | WO 2018098161 | 5/2018 |
| WO | WO 2018118112 | 6/2018 |
| WO | WO 2018147873 | 8/2018 |

OTHER PUBLICATIONS

Fairfield et al., "Traffic light mapping and detection." Robotics and Automation (ICRA), 2011 IEEE International Conference on May 9, 2011, pp. 5421-5426.

Florentine et al., "Pedestrian notification methods in autonomous vehicles for multi-class mobility-on-demand service." Proceedings of the Fourth International Conference on Human Agent Interaction, Oct. 4, 2016, pp. 387-392.

Levinson et al., "Traffic light mapping, localization, and state detection for autonomous vehicles." Robotics and Automation (ICRA), 2011 IEEE International Conference on May 9, 2001, pp. 5784-5791.

Pendleton et al., "Autonomous golf cars for public trial of mobility-on-demand service." Intelligent Robots and Systems (IROS), 2015 IEEE/RSJ International Conference on Sep. 28, 2018, pp. 1164-1171.

Standards.sae.org, "Taxonomy and Definitions for Terms Related to Driving Automation Systems for On-Road Motor Vehicles," SAE International, Sep. 2016, retrieved on Apr. 18, 2017, <http://standards.sae.org/j3016_201609/>, 3 pages.

Wikipedia.org [online], "Recursive Bayesian estimation," available on or before Mar. 20, 2017, retrieved Oct. 26, 2022, retrieved from URL <https://en.wikipedia.org/w/index.php?title=Recursive_Bayesian_estimation&oldid=771278094>, 4 pages.

\* cited by examiner

AUTOMATICALLY PERCEIVING TRAVEL SIGNALS

CROSS-REFERENCE TO RELATED APPLICATIONS

This application is a continuation of U.S. application Ser. No. 16/863,857, filed Apr. 30, 2020, now allowed, which is a continuation of U.S. application Ser. No. 15/490,616, filed Apr. 18, 2017, now U.S. Pat. No. 10,643,084, both of which are incorporated by reference.

BACKGROUND

Traffic lights and other kinds of travel signals are commonly used to control or otherwise influence the behavior of vehicles driving, for example, on a road network. One goal of providing such travel signals is to reduce accidents.

SUMMARY

The technologies described in this document automate travel signal perception. The technologies can facilitate autonomous driving or assist manual driving.

Among other advantages of these aspects, features, and implementations are the following. Accidents and collisions are reduced. Traffic jams are reduced. Driver performance is improved. Driver and passenger anxiety is reduced.

In one aspect, implementations include a method comprising: (a) identifying, in an image derived from signals of a sensor, a representation of a travel signal, (b) determining a correspondence between the representation of the travel signal and a true travel signal, and (c) estimating a signal state of the true travel signal. The method may include identifying in the image a representation of another travel signal and determining that the representation of the other travel signal corresponds to a true travel signal. Identifying the representation of the travel signal may comprise analyzing pixels of the image based on saturation or lightness or both. Identifying the representation of the travel signal may comprise determining edges based on pixels and generating a shape based on the edges. Identifying the representation of the travel signal may be based on one or more of the following criteria: edges, shapes, convexity, sizes, and solidness. Identifying the representation of the travel signal may be based on matching characteristics of the representation of the travel signal to predefined criteria. Identifying the representation of the travel signal may be based on modeling the predefined criteria probabilistically.

Some implementations include determining the correspondence based on one or more of the following: a previously identified travel signal, travel signal shapes, travel signal colors, travel signal positions, travel signal configurations, road networks, a location of the vehicle, and a route of the vehicle. Determining the correspondence may comprise using prior information associated with the travel signal. The prior information may comprise one or more of the following: shapes, sizes, colors, locations, positions, and configurations. Determining the correspondence may comprise using prior information to generate an image of a travel signal. The image may comprise a bird's-eye view or a field of view of a vision sensor or both. Determining the correspondence may comprise computing a classification score. The classification score may include a weighted sum of differences between measured data associated with the travel signal and prior information associated with the travel signal. Determining the correspondence may comprise computing a classification score based on an algorithmic analysis on measured data associated with the travel signal and prior information. In some applications, the algorithmic analysis may include (1) creating correspondences between the travel signal and known true travel signals; (2) computing a likelihood score associated with the correspondences; and (3) iterating (1) and (2) using a different set of correspondences until an optimal likelihood score associated with an optimal set of correspondences is identified. The iterating may comprise one or more of the following: a randomized search, an exhaustive search, a linear programming, and a dynamic programming.

Implementations may include estimating the signal state based on state transition information. The transition information comprises colors, shapes, flashing patterns, or combinations of them. Estimating the signal state may be based on consistency of two or more travel signals. Estimating the signal state is based on a position of a travel signal within a travel signal configuration. Estimating the signal state may comprise temporal filtering based on a previously estimated signal state.

Implementations may comprise generating an alert based on an estimated signal state.

Implementations may comprise controlling a maneuver of the vehicle based on an estimated signal state.

In another aspect, implementations include a method comprising: (a) causing a vehicle to drive autonomously on a road, (b) automatically detecting a travel signal and estimating a signal state of the travel signal, and (c) automatically controlling a maneuver of the vehicle based on the signal state. Detecting the travel signal may comprise identifying, in an image derived from signals of a sensor, a representation of the travel signal. Identifying the representation of the travel signal may comprise analyzing pixels of the image based on saturation or lightness or both. Identifying the representation of the travel signal may comprise determining edges based on pixels and generating a shape based on the edges. Identifying the representation of the travel signal may be based on one or more of the following criteria: edges, shapes, convexity, sizes, and solidness. Identifying the representation of the travel signal may be based on matching characteristics of the representation of the travel signal to predefined criteria. Identifying the representation of the travel signal may be based on modeling the predefined criteria by probabilistic distributions and inferring probabilistic scores.

Implementations may include detecting the travel signal comprising determining a correspondence between the representation of the travel signal and a true travel signal. Determining the correspondence is based on one or more of the following: a previously identified travel signal, travel signal shapes, travel signal colors, travel signal positions, travel signal configurations, road networks, a location of the vehicle, and a route of the vehicle. Determining the correspondence may comprise using prior information associated with the travel signal. The prior information may comprise one or more of the following: shapes, sizes, colors, locations, positions, and configurations. Determining the correspondence may comprise using prior information to generate a prior image of a travel signal. The prior image may comprise a bird's-eye view or a field of view of a vision sensor or both. Determining the correspondence may comprise computing a classification score. The classification score may comprise a weighted sum of differences between measured data associated with the travel signal and prior information associated with the travel signal. Determining the correspondence may comprise computing a classification score using an algorithmic analysis on measured data associated with the travel signal and prior information. The algorithmic analysis may comprise: (1) creating correspondences between the travel signal and known true travel signals; (2) computing a likelihood score associated with the correspondences; and (3) iterating (1) and (2) using a different set of correspondences until an optimal likelihood score associated with an optimal set of correspondences is identified. The iterating may comprise one or more of the following: a randomized search, an exhaustive search, a linear programming, and a dynamic programming.

Implementations may include estimating the signal state comprising using state transition information. The transition information may comprise colors, shapes, flashing patterns, or combinations of them. Estimating the signal state may be based on consistency of two or more travel signals. Estimating the signal state may be based on a position of a travel signal within a travel signal configuration. Estimating the signal state may comprise temporal filtering based on a previously estimated signal state.

Implementations may include generating an alert based on an estimated signal state.

In another aspect, implementations include a method comprising: (a) receiving an image of a field of view of a sensor associated with a vehicle, (b) identifying a candidate travel signal in the image, (c) determining that the candidate travel signal is relevant to the travel of the vehicle, and (d) alerting a driver of the vehicle of a signal state of the travel signal. Identifying the candidate travel signal may comprise analyzing pixels of the image based on saturation or lightness or both. Identifying the candidate travel signal may comprise determining edges based on pixels and generating a shape based on the edges. Identifying the candidate travel signal may be based on one or more of the following criteria: edges, shapes, convexity, sizes, and solidness. Identifying the candidate travel signal may be based on matching characteristics of the candidate travel signal to predefined criteria. Identifying the candidate travel signal may be based on modeling the predefined criteria probabilistically.

Implementations of determining that the candidate travel signal is relevant to the travel of the vehicle may be based on one or more of the following: a previously identified travel signal, travel signal shapes, travel signal colors, travel signal positions, travel signal configurations, road networks, a location of the vehicle, and a route of a vehicle. Determining that the candidate travel signal is relevant to the travel of the vehicle may comprise using prior information associated with the candidate travel signal. The prior information may comprise one or more of the following: shapes, sizes, colors, locations, positions, and configurations. Determining that the candidate travel signal is relevant to the travel of the vehicle may comprise using the prior information to generate a prior image of a travel signal. The prior image may comprise a bird's-eye view or a field of view of a vision sensor or both. Determining that the candidate travel signal is relevant to the travel of the vehicle may comprise computing a classification score. The classification score may comprise a weighted sum of differences between measured data associated with the candidate travel signal and prior information associated with the candidate travel signal. Determining that the candidate travel signal is relevant to the travel of the vehicle may comprise computing a classification score based on an algorithmic analysis on measured data associated with the candidate travel signal and prior information. The algorithmic analysis may comprise (1) creating correspondences between the candidate travel signal and known true travel signals; (2) computing a likelihood score associated with the correspondences; and (3) iterating (1) and (2) using a different set of correspondences until an optimal likelihood score associated with an optimal set of correspondences is identified. The iterating may comprise one or more of the following: a randomized search, an exhaustive search, a linear programming, and a dynamic programming.

Implementations of determining that the candidate travel signal is relevant to the travel of the vehicle may comprise estimating the signal state comprises using state transition information. The transition information may comprise colors, shapes, flashing patterns, or combinations of them. Determining that the candidate travel signal is relevant to the travel of the vehicle may comprise estimating the signal state based on consistency of two or more travel signals. Determining that the candidate travel signal is relevant to the travel of the vehicle may comprise estimating the signal state based on a position of a travel signal within a travel signal configuration. Determining that the candidate travel signal is relevant to the travel of the vehicle may comprise estimating the signal state using temporal filtering based on a previously estimated signal state. Determining the true travel signal is relevant to the travel of the vehicle may comprise determining if the true travel signal impacts a driving decision of the vehicle. Determining the true travel signal is relevant to the travel of the vehicle may be based on a route of a vehicle.

In another aspect, implementations include an apparatus comprising: (a) an image processor configured to receive an image derived from signals of a sensor and to apply signal processing to the image to identify a representation of a travel signal in the image, (b) a classifier configured to receive information from the image processor that identifies the representation of the travel signal and to classify the representation of the travel signal, (c) an estimator configured to estimate a signal state of the travel signal, and (d) an output module to generate an alert or control a maneuver of the vehicle or both based on the estimated signal state.

The classifiers may be configured to classify the representation of the travel signal as a true travel signal or not a true travel signal.

The image processor may be configured to analyze pixels of the image based on saturation or lightness or both. The image processor may be configured to determine edges based on pixels and to generate a shape based on the edges. The image processor may be configured to identify the representation of the travel signal based on one or more of the following criteria: edges, shapes, convexity, sizes, and solidness. The image processor may identify the representation of the travel signal based on matching characteristics of the representation of the travel signal to predefined criteria. The image processor may identify the representation of the travel signal based on modeling the predefined criteria probabilistically.

In implementations, the classifier may classify the representation based on one or more of the following: a previously identified travel signal, travel signal shapes, travel signal colors, travel signal positions, travel signal configurations, road networks, a location of the vehicle, and a route of a vehicle. The classifier may classify the representation using prior information associated with the travel signal. The prior information may comprise one or more of the following: shapes, sizes, colors, locations, positions, and configurations. The classifier may classify the representation using the prior information to generate a prior image of a travel signal. The prior image may comprise a bird's-eye view or in a field of view of a vision sensor or both. The classifier may classify the representation by computing a classification score. Computing the classification score may comprise computing a weighted sum of differences between measured data associated with the travel signal and the prior information associated with the travel signal. Computing the classification score may be based on an algorithmic analysis on measured data associated with the travel signal and prior information. The algorithmic analysis may comprise: (1) creating correspondences between the travel signal and known true travel signals; (2) computing a likelihood score associated with the correspondences; and (3) iterating (1) and (2) using a different set of correspondences until an optimal likelihood score associated with an optimal set of correspondences is identified. The iterating may comprise one or more of the following: a randomized search, an exhaustive search, a linear programming, and a dynamic programming.

Implementations may include the estimator estimating the signal state by using state transition information. The transition information may comprise colors, shapes, flashing patterns, or combinations of them. The estimator may estimate the signal state based on consistency of two or more travel signals. The estimator may estimate the signal state based on a position of a travel signal within a travel signal configuration. The estimator may estimate the signal state by temporal filtering based on a previously estimated signal state.

Implementations may include the output module generating a visual alert or an audio alert or both. The output module may generate a map with a route of the vehicle.

These and other aspects, features, and implementations can be expressed as methods, apparatus, systems, components, program products, methods of doing business, means or steps for performing a function, and in other ways.

These and other aspects, features, and implementations will become apparent from the following descriptions, including the claims.

DESCRIPTION

Among other things, the technologies described in this document perceive (for example, detect information about) travel signals by, e.g., applying image processing to images of the travel signals acquired using, for example, onboard sensors on a vehicle. The image processing can include extracting candidate travel signals in the captured images, classifying the candidate travel signals into true ones, and then identifying relevant travel signals among the true ones. The states of the travel signals are also estimated. The technologies (which we sometimes refer to as a travel signal perception system) may be integrated into a vehicle system. A vehicle system could include or be implemented in a single electronic device (e.g., a GPS device, a mobile phone, and a mobile computing device). The technologies can facilitate safer driving decisions for manually-driven and self-driving vehicles.

The term "vehicle" is used broadly in this document to include any vehicle that has manual driving capability, or autonomous driving capability, or both. A vehicle can drive in an autonomous mode or a human-operated mode or a combination of them, e.g., a human-guided autonomous mode or a machine-assisted manual mode. The technologies described in this document can be combined with any vehicle in any automated level (e.g., Level 0 with no automation, Level 1 with driver assistance, Level 2 with partial automation, Level 3 with conditional automation, Level 4 with high automation, and Level 5 with full automation) defined by the SAE International's standard J3016: Taxonomy and Definitions for Terms Related to On-Road Motor Vehicle Automated Driving Systems, which is incorporated by reference in its entirety.

The term "perceive" is used broadly to include any recognition, identification, or derivation of the size, shape, distance, configuration, orientation, grouping, number, text, color, operational state, or other characteristic or a combination of them.

The term "travel signal" is used broadly to include, for example, any device that provides a visible indication of a driving behavior for a vehicle or a driving condition to be considered in the driving of the vehicle. The visible indication can carry any degree of authority with respect to the behavior or condition including informing, advising, suggesting, encouraging, requiring, or mandating the behavior or attention to the condition.

The term "true travel signal" is used broadly to include any travel signal known to exist. The information about a true travel signal may be acquired from a data source (e.g., a database or a road map or both), or from an indication of a true travel signal based on a prior analysis of data acquired by a vehicle, or from both.

The term "relevant travel signal" is used broadly to include, for example, any travel signal pertinent to or useful for a driving decision (e.g., proceed, slow down, or stop) or other activity of a vehicle.

Vehicle System

Figure 1A:
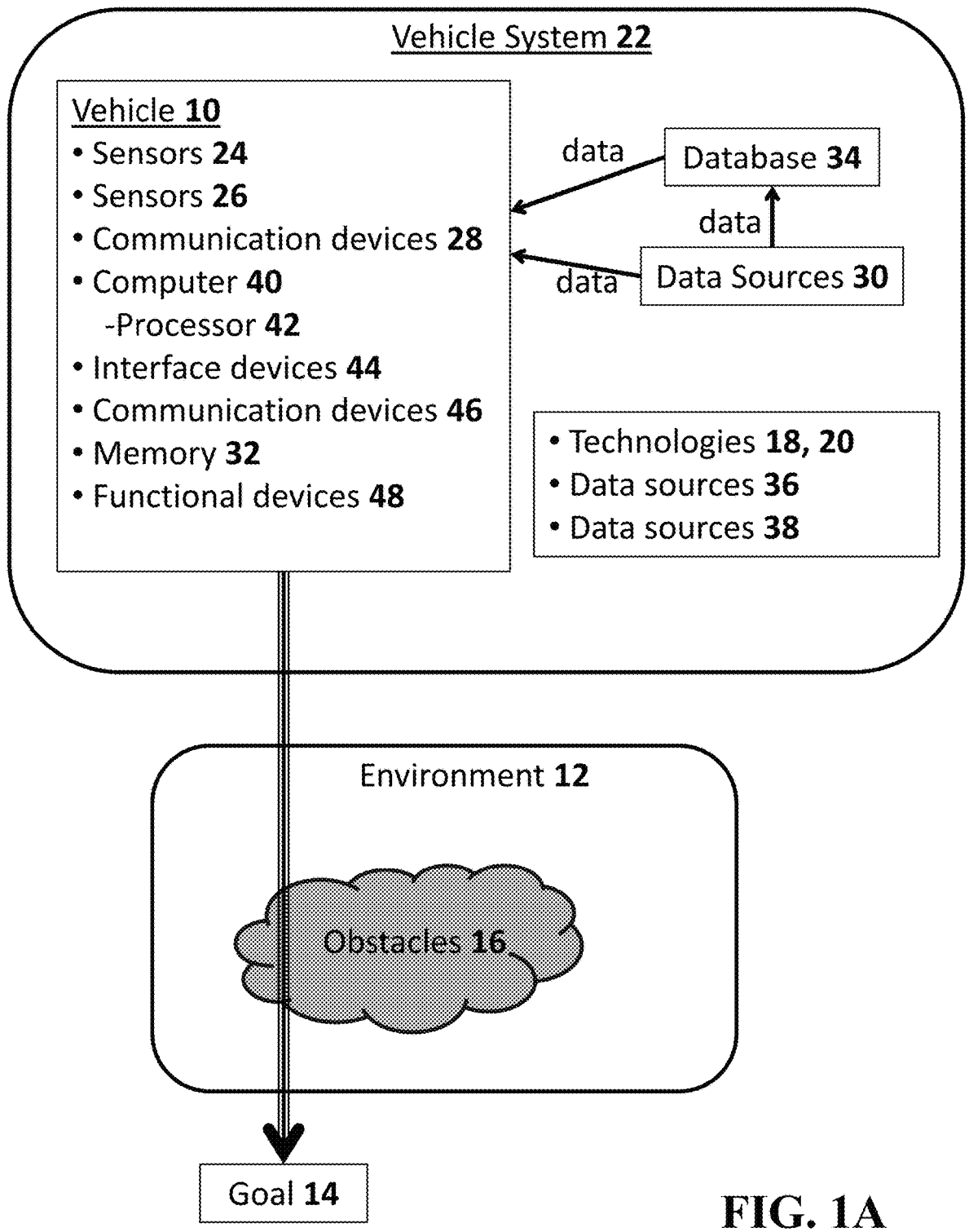
FIG. 1A is a block diagram of a vehicle system.

As shown in FIG. 1A, a typical activity of a vehicle 10 is to safely and reliably drive manually or autonomously or both through an environment 12 to a goal location 14, while avoiding vehicles, pedestrians, cyclists, and other obstacles 16 and obeying rules of the road (e.g., rules of operation or driving preferences). A vehicle's ability to autonomously perform this activity often is referred to as an autonomous driving capability.

The driving of a vehicle typically is supported by an array of technologies 18 and 20, (e.g., hardware, software, and stored and real time data) that this document together refers to as a vehicle system 22. In some implementations, one or some or all of the technologies are onboard the vehicle. In some cases, one or some or all of the technologies are at another location such as at a server (e.g., in a cloud computing infrastructure). Components of a vehicle system can include one or more or all of the following (among others).

1. Memory 32 for storing machine instructions and various types of data.
2. One or more sensors 24 for measuring or inferring or both properties of the vehicle's state and condition, such as the vehicle's position, linear and angular velocity and acceleration, and heading (i.e., orientation of the leading end of the vehicle). For example, such sensors can include, but are not limited to: GPS; inertial measurement units that measure both vehicle linear accelerations and angular rates; individual wheel speed sensors for measuring or estimating individual wheel slip ratios; individual wheel brake pressure or braking torque sensors; engine torque or individual wheel torque sensors; and steering wheel angle and angular rate sensors.
3. One or more sensors 26 for measuring properties of the vehicle's environment. For example, such sensors can include, but are not limited to: LIDAR; RADAR; monocular or stereo video cameras in the visible light, infrared and/or thermal spectra; ultrasonic sensors; time-of-flight (TOF) depth sensors; and temperature and rain sensors.
4. One or more devices 28 for communicating measured or inferred or both properties of other vehicles' states and conditions, such as positions, linear and angular velocities, linear and angular accelerations, and linear and angular headings. These devices include Vehicle-to-Vehicle (V2V) and Vehicle-to-Infrastructure (V2I) communication devices, and devices for wireless communications over point-to-point or ad-hoc networks or both. The devices can operate across the electromagnetic spectrum (including radio and optical communications) or other media (e.g., acoustic communications).
5. One or more data sources 30 for providing historical, or real-time, or predictive information, or a combination of any two or more of them about the environment 12, including, for example, traffic congestion updates and weather conditions. Such data may be stored on a memory storage unit 32 on the vehicle or transmitted to the vehicle via wireless communications from a remote database 34.
6. One or more data sources 36 for providing digital road map data drawn from GIS databases, potentially including one or more of the following: high-precision maps of the roadway geometric properties; maps describing road network connectivity properties; maps describing roadway physical properties (such as the number of vehicular and cyclist traffic lanes, lane width, lane traffic directions, lane marker type and location); and maps describing the spatial locations of road features such as crosswalks, traffic signs or other travel signals of various types (e.g., stop, yield) and traffic signals or other travel signals of various types (e.g., red-yellow-green indicators, flashing yellow or red indicators, or right or left turn arrows). Such data may be stored on a memory storage unit 32 on the vehicle, or transmitted to the vehicle by wireless communication from a remotely located database, or a combination of the two.
7. One or more data sources 38 for providing historical information about driving properties (e.g., typical speed and acceleration profiles) of vehicles that have previously traveled along local road sections at similar times of day. Such data may be stored on a memory storage unit 32 on the vehicle, or transmitted to the vehicle by wireless communication from a remotely located database 34, or a combination of the two.
8. One or more computer systems 40 located on the vehicle for executing algorithms (e.g., processes 42) for the on-line (that is, real-time on board) generation of control actions based on both real-time sensor data and prior information, allowing a vehicle to execute its manual or autonomous or both driving capability.
9. One or more interface devices 44 (e.g., displays, mouses, track points, keyboards, touchscreens, speakers, biometric readers, and gesture readers) coupled to the computer system 40 for providing information and alerts of various types to, and to receive input from, occupants of the vehicle. The coupling may be wireless or wired. Any two or more of the interface devices may be integrated into a single one.
10. One or more wireless communication devices 46 for transmitting data from a remotely located database 34 to the vehicle and to transmit vehicle sensor data or data related to driving performance to a remotely located database 34.
11. Functional devices and vehicle features 48 that are instrumented to receive and act on commands for driving (e.g., steering, acceleration, deceleration, gear selection) and for auxiliary functions (e.g., turn indicator activation) from the computer system.

Figure 1B:
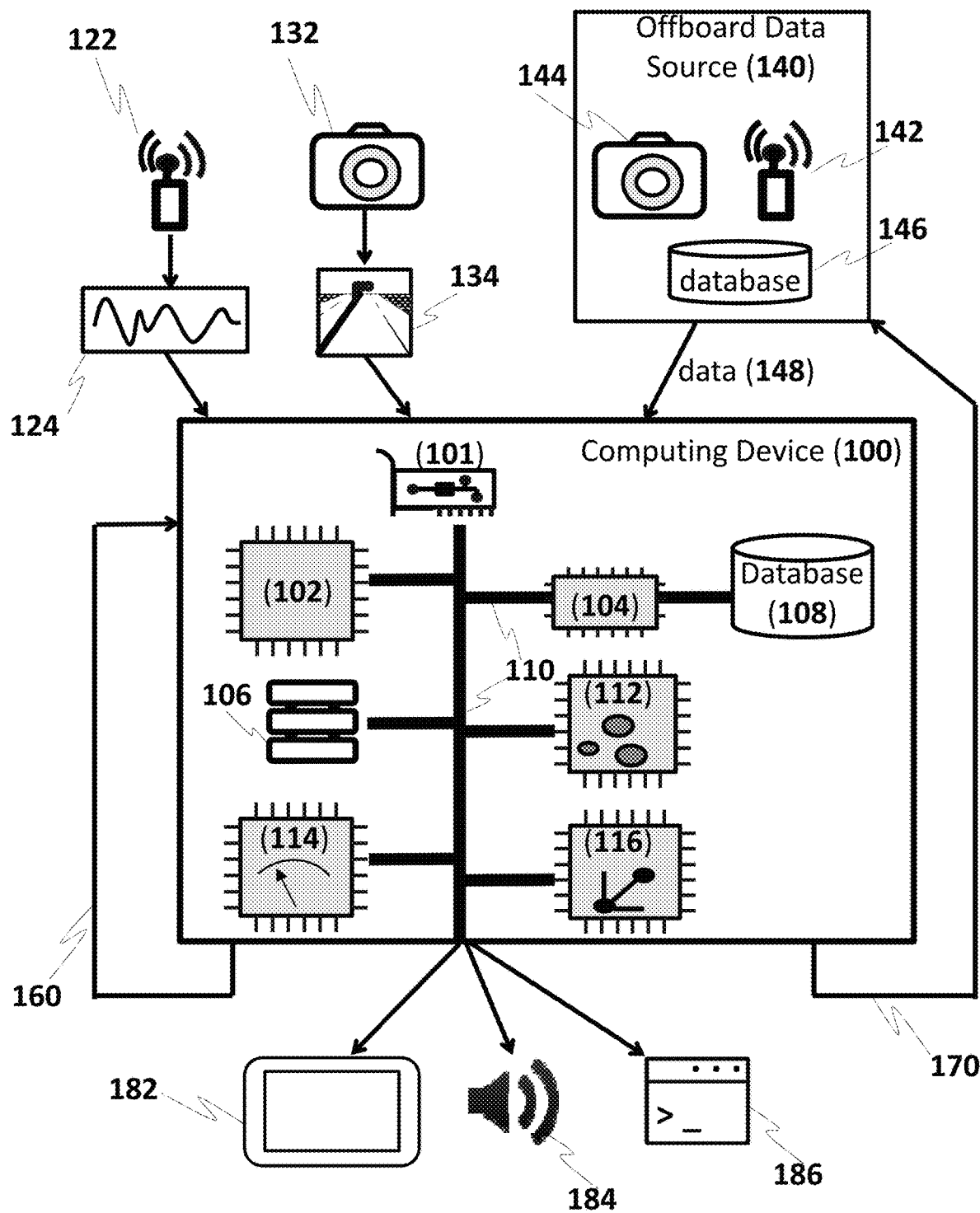
FIG. 1B is a block diagram of a system of travel signal perception.

FIG. 1B shows an example of a travel signal perception system. One or more sensors 122 (e.g., a LIDAR, a radar, a GPS receiver, an ultrasonic sensor, a time-of-flight (TOF) depth sensor, a temperature sensor, a speed sensor, and a rain sensor) onboard the vehicle collect and transmit signals 124 to a computing device 100, which may be a standalone apparatus or a component of a vehicle system, via a network interface 101. The network interface 101 may be wireless or wired or both. For instance, a GPS sensor records current positions of the vehicle driving on a road network; or a velocity sensor records the speeds of the vehicle and other vehicles. A vision sensor 132 (e.g., a monocular or stereo video camera able to record a scene in the visible light, infrared and/or thermal spectra) onboard the vehicle collects and transmits images or videos 134 to the computing device 100 via the network interface 101. The computing device 100 may receive data 148 from one or more offboard data sources (e.g., a sensor 142, a vision sensor 144, or a database 146, or combinations of them) installed on, for example, infrastructure, a server, another vehicle, or a building.

The computing device 100 may comprise a processor 102 and a memory 104. A travel signal perception system may use signals and data (124, 134 and 148) to perform activities associated with perceiving travel signals. When signals and data arrive at the computing device 100, the network interface 101 passes the signals and data through a data bus 110 to the processor 102 for analysis. In some cases, the signals and data are stored in the memory 104, in a data storage 106, or in a database 108, or combinations of them.

The images or videos 134 may be processed by an image processor 112 to extract candidate travel signals in images. A classifier 114 then classifies candidate travel signals into true travel signals. An estimator 116 is used to estimate a current state of the classified travel signals. The image processor 112, the classifier 114 or the estimator 116, or a combination of them may be implemented by a hardware device (e.g., field-programmable gate arrays or integrated circuits), or by one or more software modules that are executed by a generic processor 102, or a combination of them. During the data analysis, an output 160 generated by a processor (102, 112, 114, or 116) at an earlier time t−1 may be fed back to the computing device 100 as part of prior information for a later analysis at time t. The prior information may be stored in the memory 104, the data storage 106, or the database 108, or combinations of them. An output 170 generated by a processor (102, 112, 114, or 116) may be transmitted to a remote database 146, which will be used as prior information by the vehicle or another vehicle at a later time t.

An output of the computing device 100 may be visualized on a display 182, or created as an audio signal through a speaker 184, or both. An output may comprise a detected travel signal overlaid on a map, or a visual or audio or both alert about a detected true travel signal. In some implementations, an output comprises commands 186 to control acceleration, steering or braking of the vehicle.

In some implementations, the position (including location and angle) of an onboard sensor is known in advance (e.g., through automatic calibration) with respect to one or more references attached to the vehicle. For example, referring to FIG. 2, the position of a vision sensor 202 on the roof of a vehicle 200 or on the ceiling of the interior of the vehicle 200 is measured in advance, and the position is referenced with respect to one or more particular locations, e.g., the middle point 211 of the edge of a front bumper 210, or the middle point 213 of the edge of a rear bumper 212, or any other spot or label on or in the vehicle.

Figure 2:
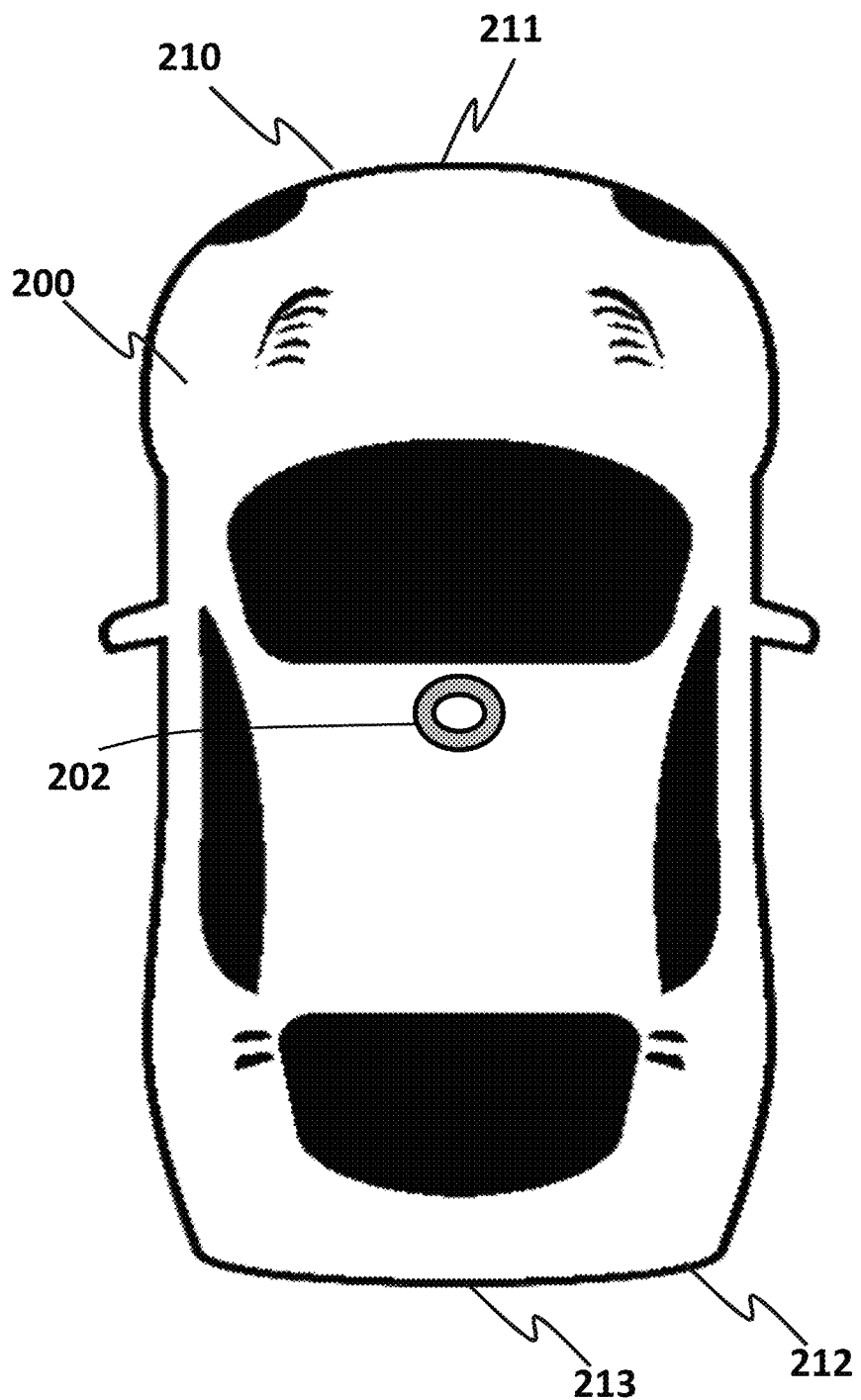
FIG. 2 shows a sensor with respect to a reference frame in a vehicle.
Figure 3:
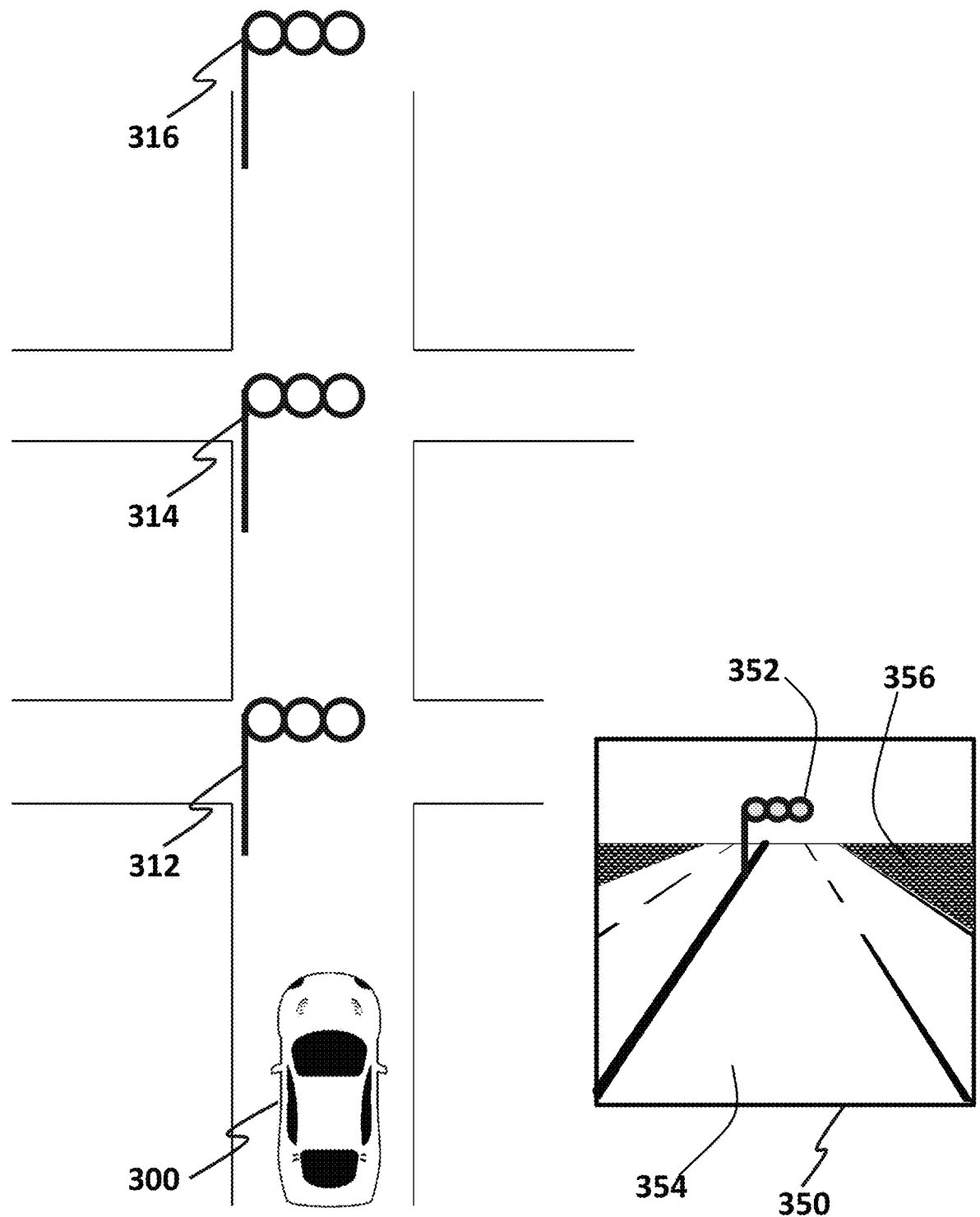
FIG. 3 shows an exemplary road with multiple travel signals.

FIG. 3 illustrates a vehicle 300 driving on a road network, and the scene 350 is an example image of the field of view of a vision sensor 202 in FIG. 2. Determining the relationship of the position of the sensor to a reference is important in understanding the orientation and direction of travel of the vehicle relative to the field of view of the vision sensor 202. In some cases, when a position of a vision sensor with respect to a reference is uncertain (due, e.g., to an error in hardware or software, a failure in calibration, a position shift, or an unclear selection of a reference point, or a combination of two or more of those), the technologies utilize a probabilistic model and statistical inference to determine the position of the vision sensor, and the position may be described by a probability distribution function for further use.

Figure 4:
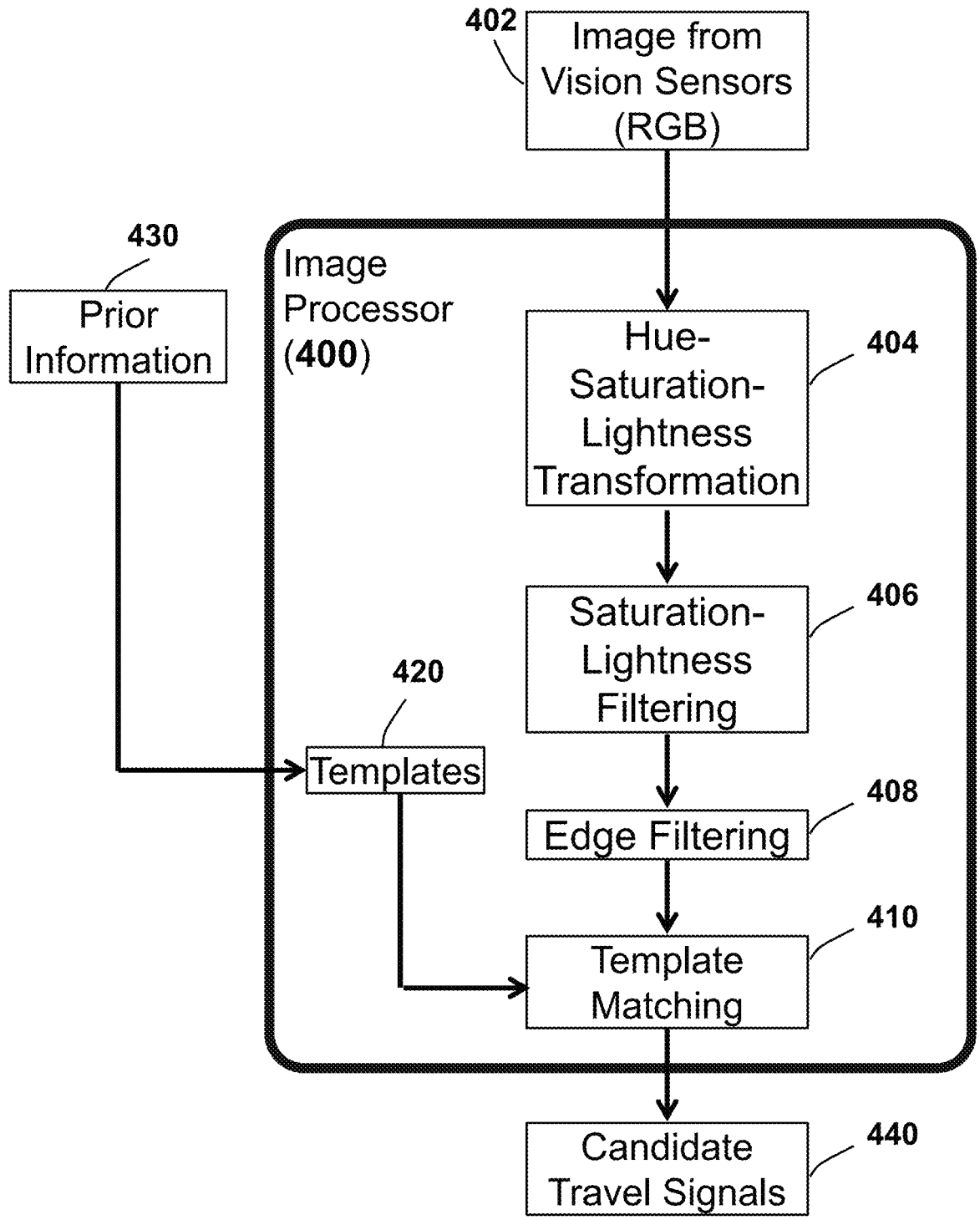
FIG. 4 shows an example of an image processor.

A travel signal 312 shown in an image 350 usually occupies a region 352 of pixels rather than the entire image, so image processing is applied to locate the travel signal in the image. A travel signal may be brighter than background objects (e.g., a road 354, a sidewalk 356, a vehicle, a pedestrian, a tree, an animal, or a building), but darker than some objects (e.g., the sun, or a light reflection from a glass, metal or mirror). The brightness and darkness can be determined in terms of saturation and lightness information of the pixels. Referring FIG. 4, the image processor 400 may convert an acquired image from a RGB representation 402 into an HSL (Hue-Saturation-Lightness) representation 404, also called an HSV (Hue-Saturation-Value). Next, the image processor 400 may filter out 406 pixels having values of saturation and lightness that are lower than a lower bound or higher than a higher bound or both. The pixels with saturation or lightness or a combination of them below an upper bound or above a lower bound or both are retained for additional processing.

Bright pixels, or regions of bright pixels, in an image may not all correspond to travel signals but may be due to, among others, lamps on other vehicles, street lights, building lights, reflections, the sun, or the moon. Since travel signals typically have certain shapes (e.g., circles, squares, diamonds and arrows), the pixels captured from them also typically present similar shapes in images. In other words, the boundary of a bright region in the image presents sharp value changes in lightness or color, and the shape of the boundary is useful information as well. Thus, the image processing may perform edge filtering, which identifies edges of objects with sharp changes in pixel values. The edge filtering 408 can separate out objects that might be in an image. The edge filtering may be performed on the RGB image or on the HSL image, which may or may not have been filtered by saturation and lightness.

Since an image comprises a discretized domain, a true edge that is not a straight line (e.g., a curve or round boundary) may be represented by one or more line segments in the image. Therefore, an object identified by the edge filtering may be a polygon. An output of the edge filtering may comprise zero, one or more polygons. When there exists at least one polygon, each polygon is then tested to see if it can be deemed a candidate travel signal. The test criteria may include, but not be limited to, one or a combination of any two or more of the following:

1. Convexity and Shape. A travel signal may be expected to appear in an image, if the vehicle is at a particular location and has a particular orientation, for example, based on information in road map data or a database or both. Such a travel signal may be known to have a specific shape (e.g., a circle or a square), and the image intensities of the pixels captured from the travel signal may be expected to form that known shape (or a version of it). For instance, a circular travel signal typically shows up in an image as a circle or an ellipse. Largely, the shapes of travel signals are convex, so the image processing evaluates convexity (or concavity) of the polygons. A polygon with a low convexity (or a high concavity) has a low likelihood of representing a travel signal compared to a higher convexity polygon. On the other hand, a polygon may be approximated as an ellipse by finding a smallest ellipse trapping the polygon. The ratio of the minor axis to the major axis of such an ellipse may be used as a measure of circularity. The closer the ratio to 1, the more likely the polygon is circular. In theory, a perfect circle has a ratio exactly equal to 1, and polygons have ratios between 0 and 1. Therefore, any polygon whose ratio is above a threshold is deemed circular, and therefore may be likely considered as a candidate travel signal.
2. Size. A polygon representing a travel signal should not be smaller than a threshold or larger than a threshold. For instance, a polygon that is too large (e.g., covering half of the image) may be much more likely to correspond to an object very close to the vehicle's vision sensor (e.g., a tail light of another car just in front of the vehicle) than to a true travel signal. Similarly, a polygon that is too small may correspond to a travel signal that is too far away and is thus negligible, or may be a stray source of light, or may be noise in the image.
3. Solidness. A polygon representing a travel signal that is not an arrow or a turn light normally has a solid color or brightness. The solidness of a polygon may be measured, for example, by the absence of any other smaller polygon within it. In other words, any polygon that contains another polygon within may be disqualified as a candidate travel signal.

One or combinations of two or more of the above criteria can be encoded as one or more templates 420 based on prior information 430, e.g. databases, maps or previous analyzed data, or combinations of them. Evaluating one or more of the above criteria may be based on template matching 410. By template matching we mean comparing the values of one or more criteria against particular values or ranges of values for those criteria that are predefined by one or more of the templates. The travel signal perception system may create one or more templates 420 for each criterion, or create a single template encoding two or more criteria, or both. The templates may depend on geographic regions. A template of a criterion may comprise mean and deviation values. A template of a shape may comprise a mean shape and deviation shapes. A template of a criterion may include template values for multiple criteria; for example, a template of solidness may comprise one or more of the following: a color distribution in the HSL space or in the RGB color space, a shape, a dimension.

Template matching 410 of one or more of the above criteria may be based on a weighted sum. For example, each criterion may be represented by a scale, e.g., between 0 and 10, and the matching with a template gives a numeric score representing a degree of the match. The technologies further assign weights to the scores of different criteria, and the weighted sum may be used to determine, for example, if a polygon is a qualified candidate travel signal.

Template matching 410 of one or more of the above criteria may be based on Bayesian inference. For example, each criterion is represented by a probability distribution function defined in one or more of the templates. The criteria together may form a joint probability distribution. A Bayesian inference is then applied to a polygon to determine a probability of the polygon satisfying the criteria. The polygon with a probability passing a threshold is determined to be a qualified candidate travel signal.

Finally, the image processor 400 identifies zero, one or more candidate travel signals 440 in the images and stores information about their locations in the images. We call this "extracting" the candidate travel signals from the images.

Travel Signal Classification

Figure 5:
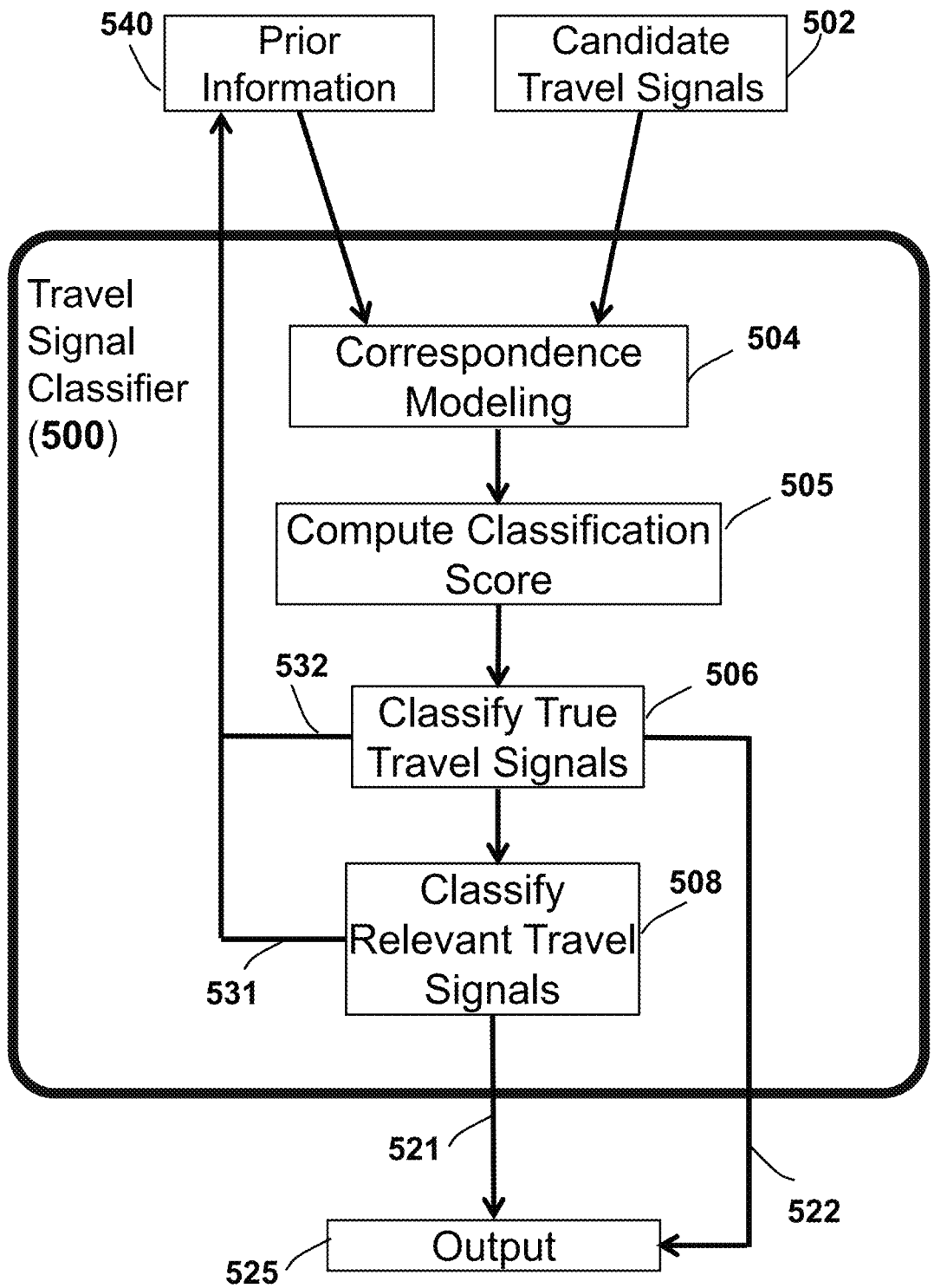
FIG. 5 shows an example of a travel signal classifier.

Referring to FIG. 5, when candidate travel signals 502 are extracted by the image processor, a travel signal classifier 500 may construct a correspondence model 504 between candidate travel signals and true travel signals and compute a classification score 505. Based on the classification score 505, the travel signal classifier 500 may identify true travel signals 506 among the candidate travel signals and select relevant travel signals 508 from among the true traffic signals. A candidate travel signal may not be a true travel signal, because it is a false positive. In some cases, a true travel signal may be considered as a relevant travel signal for the vehicle when it is related to making a driving decision at a current moment. For instance, a travel signal being detected too far way (e.g., beyond 500 meters) from the vehicle does not impact current driving decisions and may be considered irrelevant.

FIG. 3 illustrates an example in which a vehicle 300 is driving on a straight road, where three travel signals 312, 314 and 316 are installed and separated by 100 meters along the road. The vehicle 300 may need only to identify the closest travel signal 312 as a relevant travel signal, because the vehicle 300 at the current moment must obey that travel signal 312. In some implementations, the classifier may consider not only the closest travel signal 312 but also the next travel signal 314 to be encountered and so on. One reason may be to enhance the accuracy of travel signal classification or signal estimation or both. Another reason may be that the closest travel signal 312 may be partially occluded, e.g., by a tree or a piece of construction equipment, and the information from a farther travel signal 314 or 316 may be used to infer the relevance of the closest travel signal 312. In these cases, both travel signals 312 and 314 are deemed relevant travel signals. This principle can be applied to additional travel signals and travel signals of various types After the classification steps 506 and 508, the travel signal classifier may generate one or more classified travel signals 521 that are true and relevant as an output 525. In some cases, the determining of relevant travel signals may be skipped, and classified true travel signals 522 are generated as the output 525.

A classified true travel signal 532 or a relevant travel signal 531, or both, may be fed back to the correspondence model 504 and stored as part of prior information 540 for a future analysis.

In some implementations, classifying a true travel signal 506 may include accessing additional data (e.g., a road map or a database or sensor data) as part of prior information 540. The prior information 540 may comprise one or a combination of any two or more of the following:

1. Location of the ego vehicle. A location and a direction of the vehicle on a road can be determined based on a database, or road map data, or one or more sensors (e.g., GPS sensors), or combinations of them. A sensor may be onboard the vehicle or offboard the vehicle. An offboard sensor may be a sensor installed on, for example, another vehicle or an infrastructure or both. The data, which is acquired from any data source or from any sensors or from both, is used to infer the location of the vehicle. However, when the location is uncertain (e.g., due to an error in hardware or software, a failure in calibration, a failure in connection to databases, a position shift, or combinations of them), the technologies utilize a probabilistic modeling and statistical inference to determine the location of the vehicle.

Figure 6A:
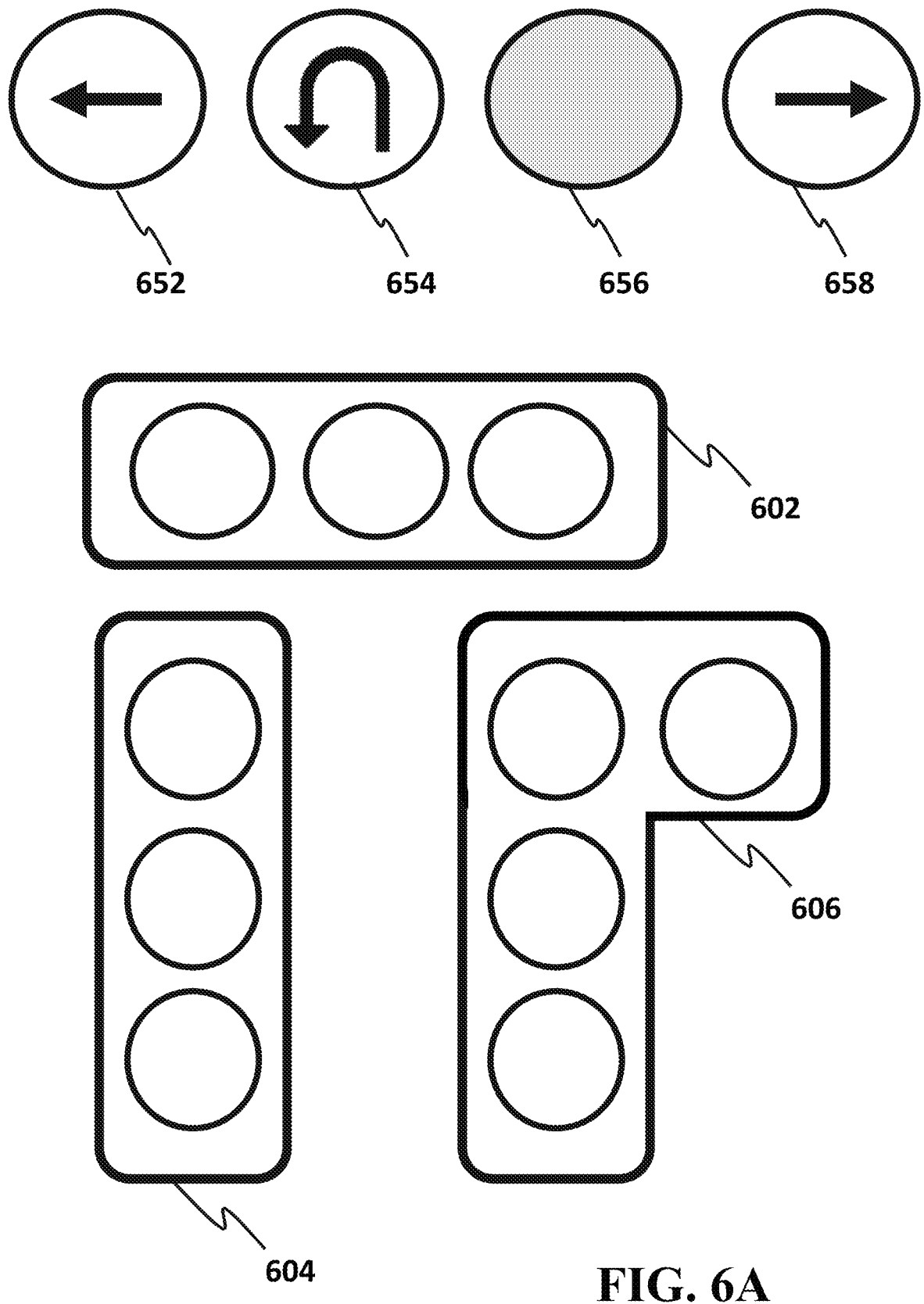
FIGS. 6A and 6B show examples of travel signals.

2. Shapes. In some instances, a travel signal may comprise one or more of the following shapes or combinations of them. FIG. 6A shows some examples of travel signals, such as a left turn arrow 652, a U-turn arrow 654, a solid circular light 656, a right turn arrow 658, or combinations of them. Some implementations may take into account possible shape uncertainties by modeling a shape using a probability distribution function.

3. Colors. Travel signals may exhibit different colors and combinations of them, for example, red, amber, green or white. In some cases, other colors may be used in particular geographical regions. Some implementations may take into account possible color uncertainties by modeling a color using a probability distribution function.

4. Position and configuration. The positions (e.g., locations on roads, facing directions, configuration orientations, distances from the ground, or combinations of them) of travel signals may be encoded in road map data. Further, travel signals can exhibit a variety of configurations. For example, FIG. 6A shows travel signals horizontally organized 602, vertically organized 604, and L-shaped 606. The configurations and their dimensions (e.g., widths, lengths, heights, depths, or combinations of them) can be included in prior information. Some implementations may take into account possible uncertainties in position or configuration by modeling them using a probability distribution function.

5. Road network. Road maps or databases may include locations (e.g., intersections, bifurcations, merges, and crosswalks) where travel signals are installed. Further, the permitted traversal directions (e.g., straight, right turn, left turn, U-turn, and combinations of them) controlled by travel signals may be included in prior information. For example, referring to FIG. 6B, a right turn made by a vehicle 600 at an intersection may be permitted only when a right-turn travel signal 610 is illuminated.

6. Previously classified travel signals. Travel signal classification may be executed over a course of time. Referring to FIG. 5, a previously determined travel signal 531 or 532 may be included in prior information 540 for a use in a later time.

In some implementations, an image of a true travel signal or another visible feature in a particular environment is captured or synthesized, and it is later treated as a prior image. In some applications, a prior image comprises an image at a prior time of one or more of the following: a vehicle location, travel signal colors, travel signal shapes, travel signal positions, travel signal configurations, and road networks. A prior image may be generated based on a field of view of the vehicle's vision sensor, or based on a bird's-eye view. In some cases, a transformation is performed between a vision sensor's field of view and a bird's-eye view. For instance, information about a travel signal (e.g., a position, a height, a size, shapes and colors) may have been annotated on a map, which is based on a bird's-eye view, and a transformation is performed on the map to generate a prior image in the field of view of the vision sensor.

Generating a prior image in a field of view of the vehicle's vision sensor from a bird's-eye view, or vice versa, may rely on one or more of the following: (1) the position (including orientation) of a true travel signal in a global reference frame, based on the road map data; (2) the position (including orientation) of the vehicle in a global reference frame, based on the road map data and continuously updated sensor data; and (3) the position (including orientation) of the vision sensor in a reference frame of the vehicle. Any of these positions may be known deterministically from a data source or may be modeled probabilistically.

Figure 7:
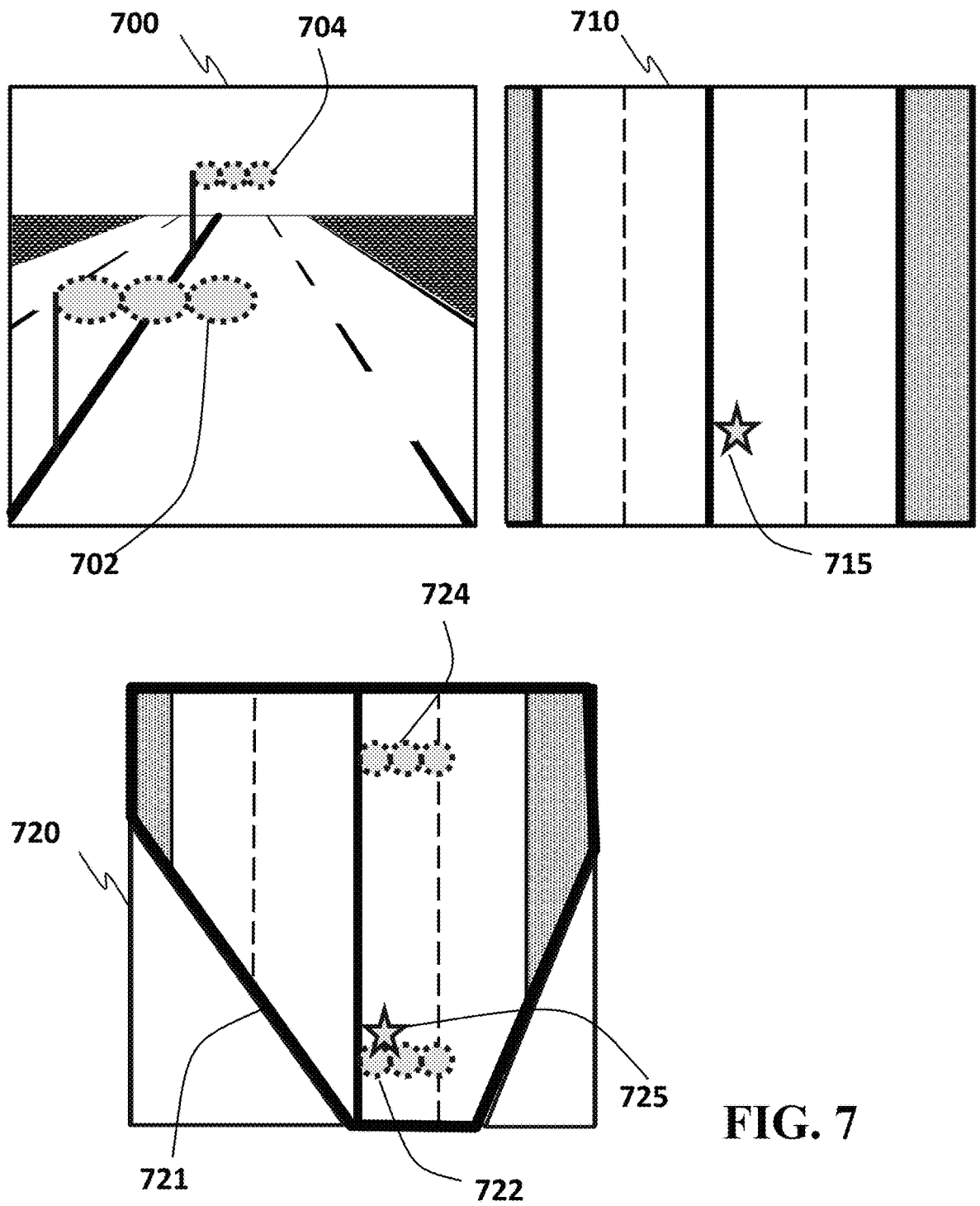
FIGS. 7, 8A and 8B show mappings between sensor images and prior information.

FIG. 7 illustrates an example, where an image 700 acquired from the vehicle's vision sensor is processed and two candidate travel signals 702 and 704 are detected. Prior information (e.g., database, annotations and sensor data) can be used to generate a prior image 710 comprising a road map, where characteristics (e.g., position, sizes, shapes, colors, and configuration) of a true travel signal 715 may have been annotated. The image 700 in the field of view of the vision sensor can be transformed into a bird's-eye view aligning with the prior image 710, resulting in a bird's-eye image 720. In the transformation, the image 700 is transformed to a polygon 721, and the images of the candidate travel signals 702 and 704 are transformed to spots 722 and 724, respectively. By comparing the transformed candidate travel signals 722 and 724 with the known position of the true travel signal 725 in the annotation (e.g., based on a thresholding scheme or a probabilistic reasoning method), the classifier determines that the candidate travel signal 722 is a true travel signal but the candidate travel signal 724 is a false positive.

Figure 8A:
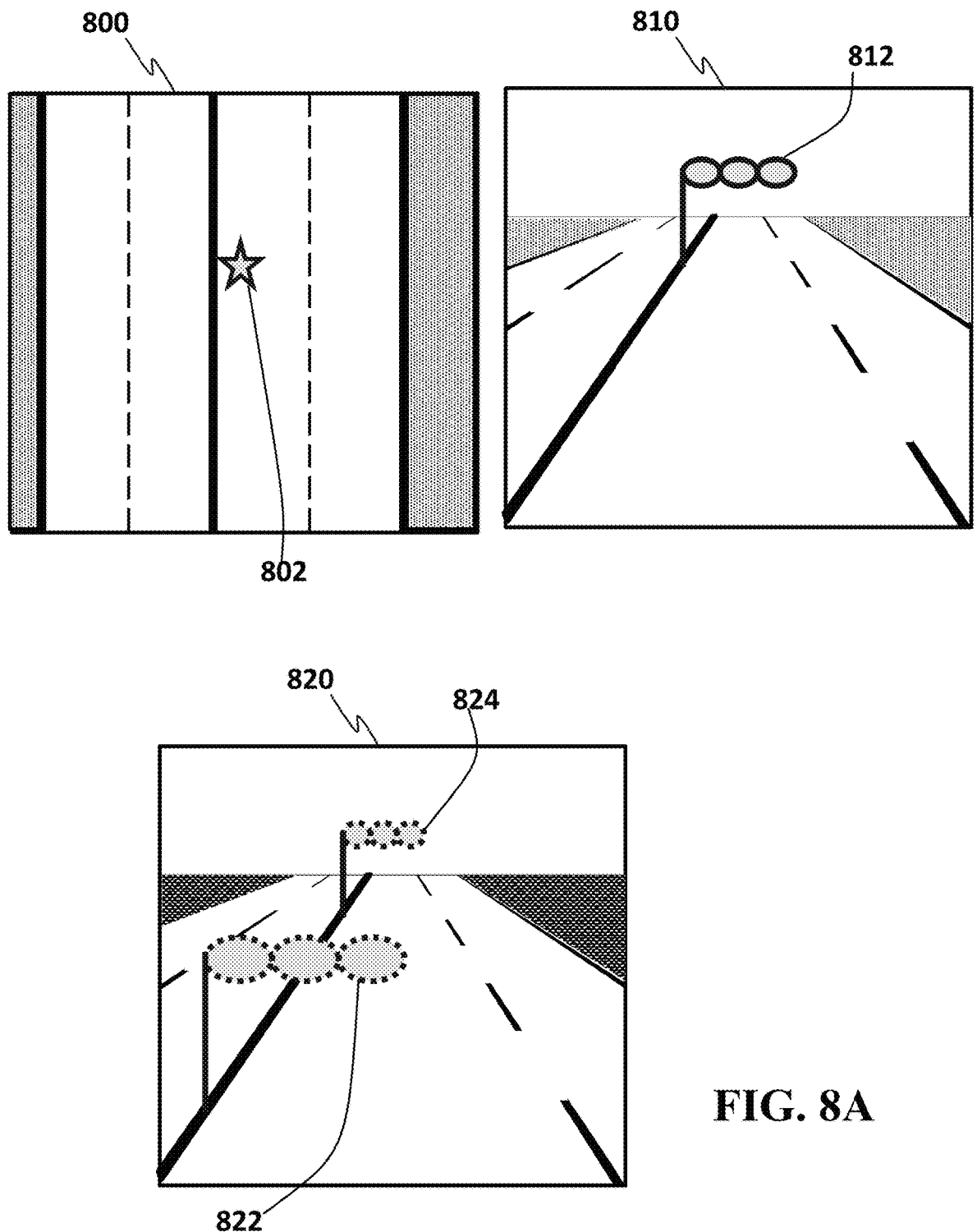

Similarly, a prior image can be generated in a field of view of a vehicle's vision sensor. Prior information with known characteristics of true travel signals may be transformed into the field of view, in order to determine what travel signals will be expected or look like. For example, FIG. 8A illustrates a map 800 that is obtained from a database and represents a neighborhood of a vehicle. From the database or from another data source, a true travel signal 802 and its information (e.g., position, shapes, colors, and configuration) is known in the neighborhood. The map 800 can be transformed into a prior image 810 in the field of view of the vision sensor, and a true travel signal 812 can be synthesized in the prior image 810. The prior image 810 can be used for classifying candidate travel signals as true travel signals. When comparing the prior image 810 with an image 820 of candidate travel signals 822 and 824, the classification can determine that the candidate travel signal 824 corresponds to the true travel signal 812 and that the candidate travel signal 822 is a false positive.

In some implementations, generation of a prior image may include one or more of the following factors:

1. Field of view. In some cases, a vision sensor has a fixed field of view; then the sensor can observe only a limited part of the space in the direction in which the vision sensor is aimed. The field of view is often specified in vertical and horizontal angular ranges, for example, a horizontal range of 120 or 150 degrees and a vertical range of 30, 45 or 60 degrees. Therefore, a portion of a prior image may be outside of the current field of view, and should be ignored because any travel signals outside of the field of view cannot be observed by the vision sensor.

Figure 8B:
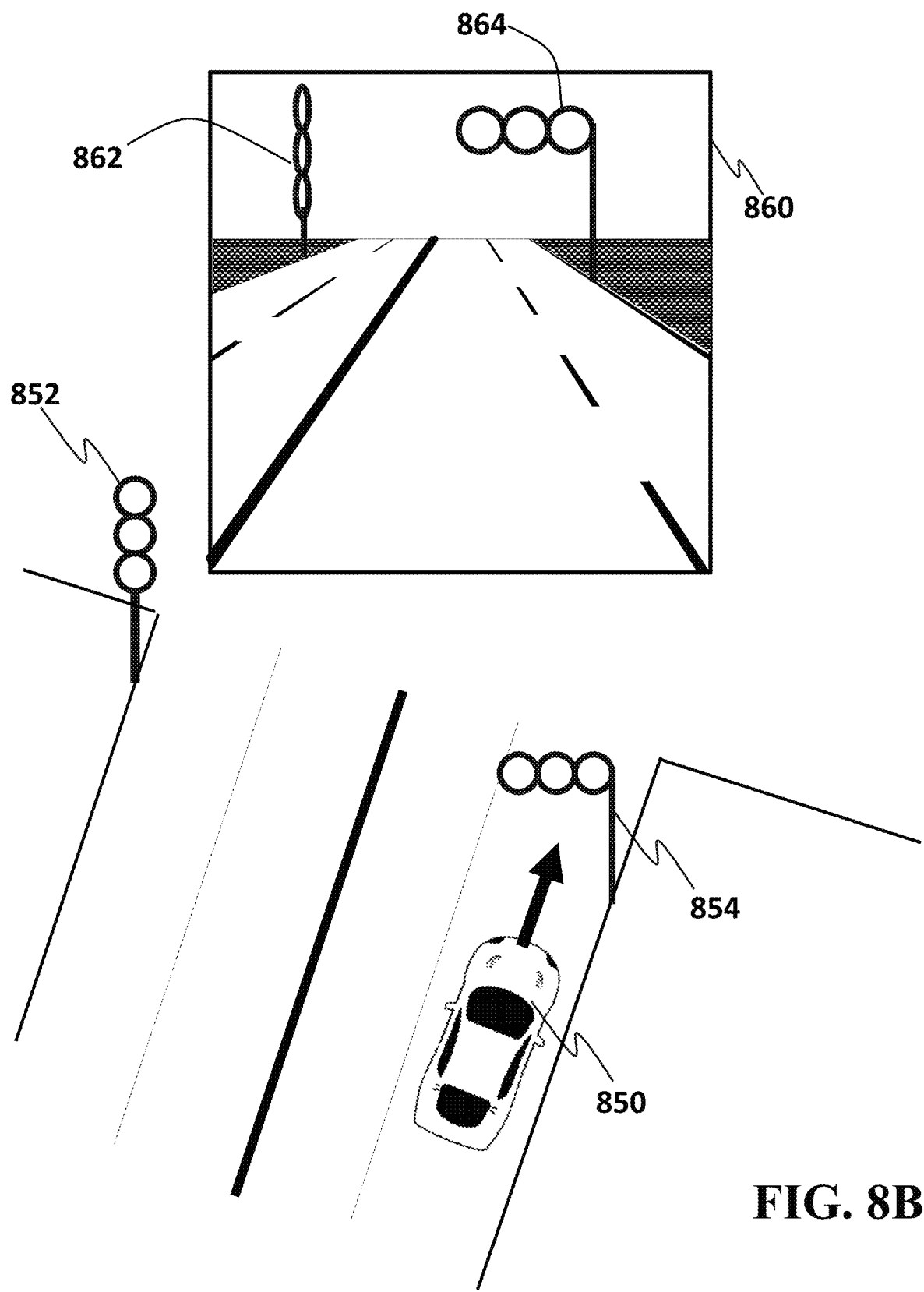

2. Shapes. A travel signal that is, for example, circular may appear in a prior image as elliptical if the orientation of the vehicle was not parallel to a signaling surface of the travel signal. For example, FIG. 8B illustrates that a vehicle 850 is driving towards an intersection, and facing two travel signals 852 and 854 whose shapes are circular. In the field of view 860 of the vehicle's vision sensor, the travel signal 854 may appear as a circular shape 864, but the travel signal 852 may appear as an elliptic shape 862. When a travel signal shown in a prior image deviates beyond a threshold from the true shape of the travel signal, the travel signal may be ignored in the prior image, because it may correspond, for example, to the view of another travel direction on the road, or may be too far away, or may be irrelevant to the vehicle. The technologies may set a lower bound on the ratio of a minor radius to a major radius of the travel signals in the transformed prior image, and discard the travel signals with a ratio smaller than the lower bound.

3. Sizes. When a travel signal is far away from the vehicle (for example, farther than 10 meters, 20 meters, 30 meters, 40 meters, 50 meters, 100 meters, 200 meters, 300 meters, 400 meters, 500 meters, or 1000 meters), its presence in a prior image may become small. In many cases, a faraway travel signal is irrelevant to a driving decision for the vehicle, so a lower bound on the sizes of the travel signals in the prior image can be applied to filter out irrelevant travel signals.

Given candidate travel signals that have been identified from image processing, classifying the true travel signals among them may be based on prior information. Using the prior information, classification may comprise evaluating correspondences between M candidate travel signal (denoted as $C_1, \ldots, C_M$) and N true travel signals (denoted as $T_1, \ldots, T_N$) annotated in prior information. Typically, the number M of the candidate travel signals is larger than the number N of the true travel signals, because the candidate travel signals may include true travel signals and false positives (e.g., street lights, brake lights, tail lights, head lights, illuminated taxi signs, reversing lamps, fog lamps, sun lights, reflections, and building lights). A correspondence indicator $F_m=n$ may be created to indicate that the candidate travel signal $C_m$ corresponds to a true travel signal $T_n$. In some cases, the correspondence indicator may reflect no correspondence (e.g., $F_m=0$). A correspondence vector $F=[F_1, F_2, \ldots, F_M]$ collecting all the correspondence indicators $F_m$ can be created and stored for further use.

In some implementations, a candidate travel signal $C_m$ may be associated with measured data (e.g., a location of the vehicle on a road network, a route, travel signal shapes, travel signal colors, travel signal positions and configurations, or combinations of them), denoted as $D_m$. A data vector $D=[D_1, D_2, \ldots, D_M]$ collecting individual measurements may be created and stored for further use.

A classification score 505 in FIG. 5 may be computed by a weighted sum of differences between measured data D and prior information. A candidate travel signal $C_m$ with a classification score below a threshold of the weighted sum may be classified as a true travel signal $T_n$. For instance, when the location of a candidate travel signal on a road network is less than 1, 2, 3, 4 or 5 meters away from a true travel signal encoded in prior information, the candidate travel signal has a high likelihood to be a true travel signal. In another example, if a candidate travel signal is measured as 0.8 meters above the ground but the prior information indicates that a true travel signal close to the location of the candidate travel signal is about 6 meters in height, then the candidate travel signal may be a false positive.

In some implementations, a classification score 505 may be computed by a Bayesian inference algorithm described as follows.

1. Initialization. The algorithm may initialize a correspondence vector $F=[F_1, F_2, \ldots, F_M]$.
2. Likelihood function. A classification score may be a likelihood function L(F, D) derived from a probability distribution function p(F|D). In some cases, measurement noise or potential measurement errors are represented by a random variable e, and the likelihood function becomes L(F, D, e).
3. Optimization. An optimization method may be employed to identify the optimal likelihood function. In some implementations, the optimization may use linear programming, or dynamic programming. A method may swap two indicators in every search step; for example, the random vector (e.g., F=[1,3,2,4]) used in a later search step may swap two correspondence indicators in the random vector (e.g., F=[1,2,3,4]) used in an earlier search step.
   In some implementations, the optimization may rely on a randomized search; e.g., the optimization randomly seeds one or more possible correspondence vectors F, and the optimal correspondence vector is derived from the possible correspondence vectors. In some cases, the seeds may be contingent on an optimal solution performed at an earlier time t−1.
   In some implementations, an exhaustive search is used; e.g., the likelihoods of all the possible correspondence vectors are examined, and the optimal correspondence vector is determined based on an optimal likelihood.

Figure 10:
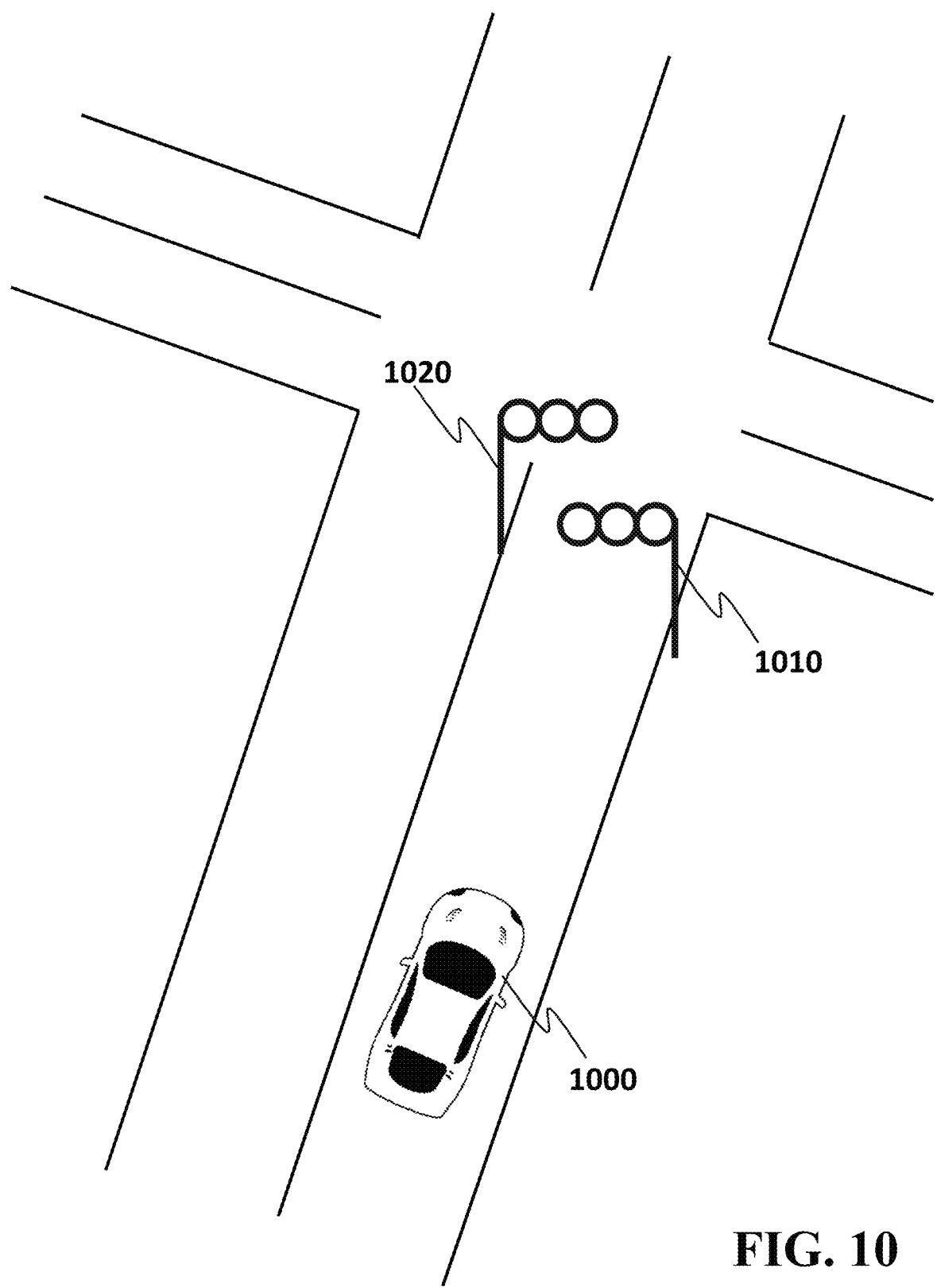

In some implementations, travel on a road may be controlled by two or more travel signals facing a same traffic direction. For instance, FIG. 10 illustrates that travel in the traffic direction of the vehicle 1000 is controlled simultaneously by travel signals 1010 and 1020. In some cases, the technologies may take the two or more travel signals as a group to classify candidate travel signals. For example, travel signals $T_n$ and $T_{n'}$ may be operated together as a group for traffic control, and candidate travel signals $C_m$, $C_{m'}$ may be considered as a group, which is deemed as a constraint in the optimization.

Figure 9:
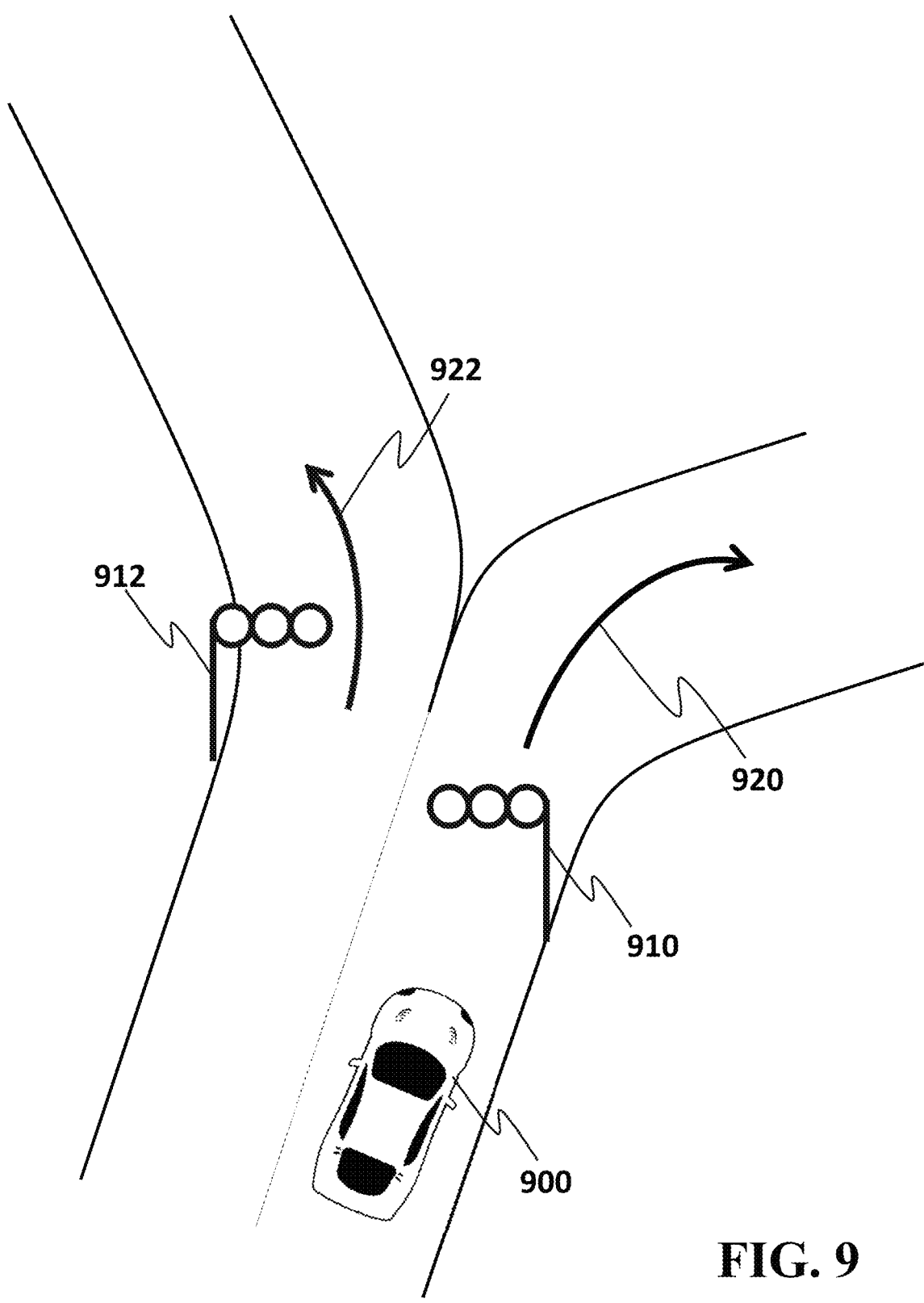
FIGS. 9 and 10 show classification of candidate travel signals.

In some implementations of classifying relevant travel signals 508 in FIG. 5, the relevance may be based on a moving direction of a vehicle, a route of a vehicle, a distance (e.g., within 5 meters, 10 meters, 50 meters, 100 meters, or 200 meters) from which a vehicle may reach, or a time interval (e.g., within 1 second, 5 seconds, 10 seconds, 20 seconds, 30 seconds, 1 minutes, or 5 minutes) for which a vehicle may reach the travel signal, or combinations of them. Since not all true travel signals are relevant, for example, to a driving decision of the vehicle, relevant travel signals are classified from among the true travel signals. For instance, in FIG. 9, a travel signal perception system may identify a true travel signal 912 facing a driving direction 922 other than the driving direction 920 of the vehicle 900, and the travel signal 912 is classified as irrelevant. Irrelevance classification may be based on one or more of the following features:

1. Position. A travel signal that is too far away from the vehicle (e.g., farther than 10 meters, 20 meters, 30 meters, 40 meters, 50 meters, 100 meters, 200 meters, 300 meters, 400 meters, 500 meters, or 1000 meters) may be irrelevant. A measure of the distance can be based on a size of a travel signal in the image.
2. Shapes. A travel signal that is not facing the driving direction of the vehicle may have a deformed shape in an image. In the example of FIG. 8B, a circular travel signal 852 that is deformed into an elliptic shape 862 may be considered irrelevant.
3. Route information. Classifying a relevant travel signal may include using route information. In some implementations, the technologies use prior information (e.g., road map data) and the vehicle's current route to identify relevant travel signals that the vehicle will first encounter. In FIG. 9, the vehicle 900 is driving on a road with a bifurcation. The vision sensor of the vehicle may capture the travel signals 910 and 912 controlling traffic leading to both branches, and the image processing may result in both travel signals 910 and 912 being candidate travel signals. However, based on the current route 920 of the vehicle, the travel signal 912 is deemed irrelevant and the travel signal 910 is kept for further consideration.

Figure 6B:
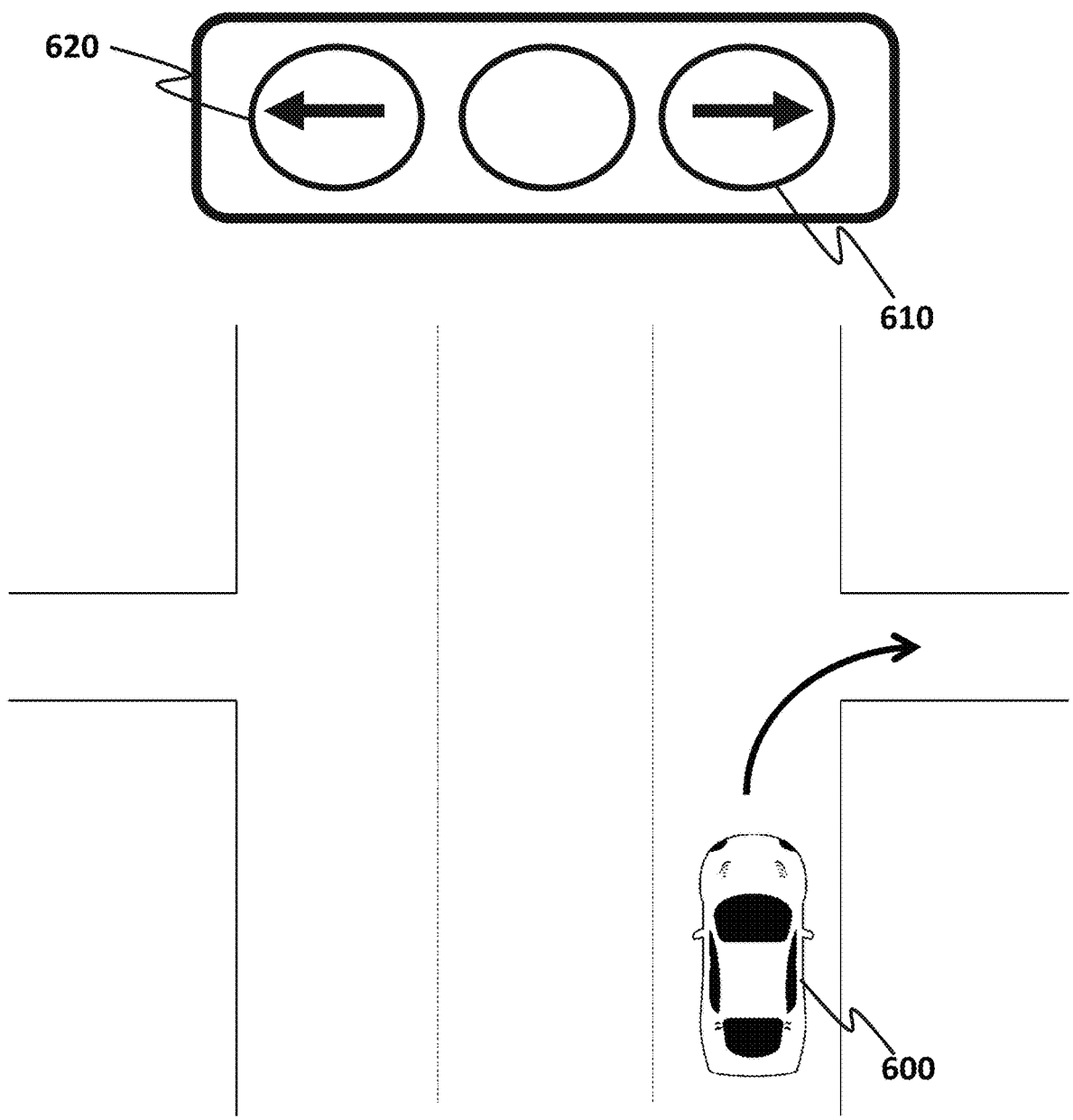

In some implementations, two or more features may be used for relevance classification. Referring to FIG. 6B, a left turn signal 620 does not control the driving direction of the vehicle 600, so the classifying may use route information to determine irrelevance. In addition, the shape (i.e., a left pointed arrow) of the left turn signal 620 may be considered as an irrelevant shape, and thus the travel signal 620 may be classified as irrelevant.

In some implementations, the order of classifying true travel signals 506 and classifying relevant travel signals 508 in FIG. 5 can be swapped. For example, in the scenario illustrated in FIG. 9, the classifier may determine that any candidate travel signals near the travel signal 912 are irrelevant, and then identify candidate travel signals corresponding to the true travel signal 910. In terms of computation, the N true travel signals, $T_1, \ldots, T_N$, annotated in prior information may be classified as relevant or irrelevant, leading to R≤N relevant travel signals being a subset of the N true travel signals. The true and relevant travel signals $T_1, \ldots, T_R$ are then used to perform travel signal classification.

Signal State Estimation

A travel signal changes its signal state (e.g., color or shape or brightness or solidness, or combinations of them) to influence the operation of vehicles, e.g., to control traffic. Once a true and relevant travel signal is identified, the technologies estimate the signal state of the travel signal. For various reasons (e.g., distortion in vision sensors), the signal state of a travel signal may not be accurately captured in an image. For instance, a red travel signal may appear to be an amber travel signal in an image; a circular travel signal may appear to be a square in an image.

Signal state estimation may be based on consistency across two or more travel signals. In some cases, two or more travel signals facing a same traffic direction may simultaneously show a same signal state. In such cases, the technologies may estimate two or more travel signals as a group, instead of individually, and constrain the travel signals' signal states to be identical. For instance, in FIG. 10, travel signals 1010 and 1020 simultaneously control the traffic, and their signal states are constrained to be identical in the estimation process.

Figure 11:
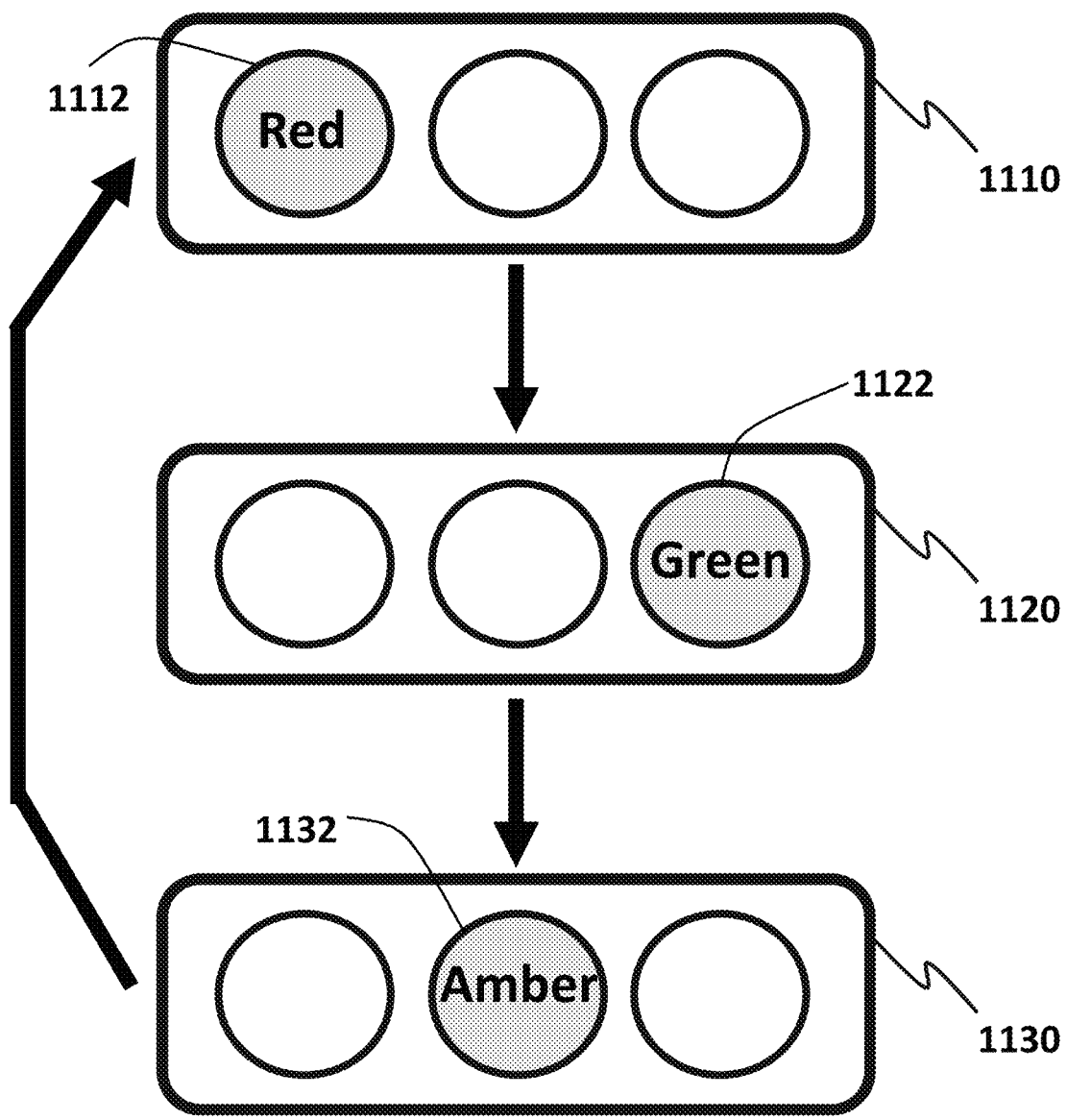
FIG. 11 shows transitioning states of a travel signal.

Signal state estimation may include evaluating a position of the signal state within a travel signal configuration. FIG. 11 illustrates an example of a horizontally configured travel signal. At the first state 1110, the stop signal (e.g., red) 1112 at the leftmost position is illuminated in the travel signal configuration. At the second state 1120, the proceed signal (e.g., green) 1122 at the rightmost position is illuminated. At the third state 1130, the slow-down signal (e.g., amber) 1132 at the middle position is illuminated. Therefore, the technologies can use knowledge about the positions of transitioning signal states in a travel signal configuration to estimate a current signal state. In some implementations, the position of a signal state is not deterministically known, and the position information can be modeled by a probability distribution function.

Figure 12:
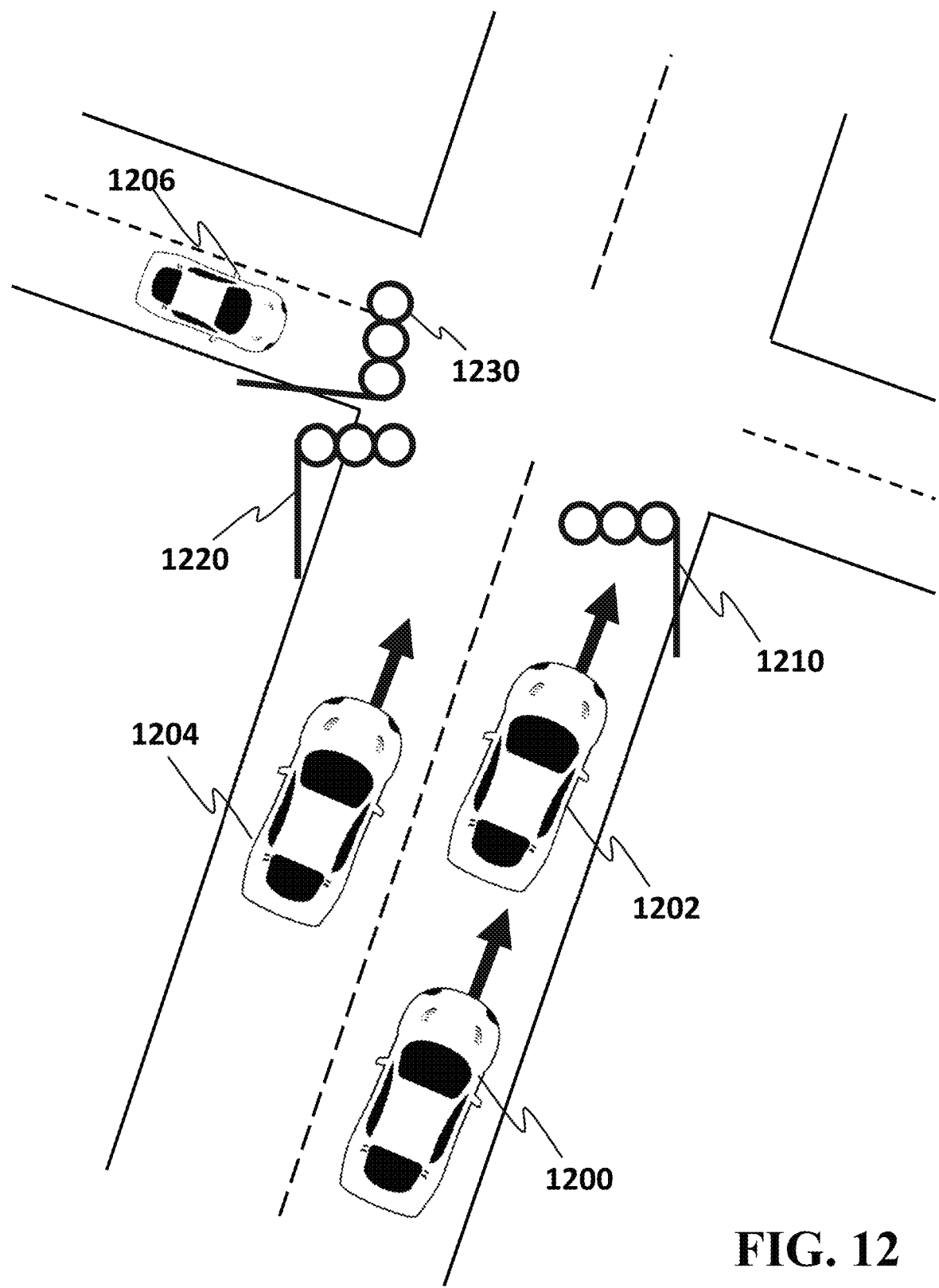
FIG. 12 shows using traffic flow to estimate a signal state of a travel signal.

Signal state estimation may include evaluating a traffic flow near the vehicle. A speed of the current traffic flow near the vehicle can be determined by one or more onboard sensors, or one or more offboard sensors, or another data source, or combinations of them. Referring to FIG. 12, vehicles 1200, 1202 and 1204 are moving under the influence of travel signals 1210 and 1220. Since the vehicles 1200, 1202 and 1204 have a similar speed, or have speeds within a range of speeds, the signal states of travel signals 1210 and 1220 are likely in a proceed state (e.g., green) at the time represented by the figure. In contrast, if another vehicle 1206 governed by a travel signal 1230 remains stopped, it is likely that the signal of the travel signal 1230 is in a stop state (e.g., red).

In some implementations, when a traffic flow along the direction of travel of the vehicle is slowing down, there is a high likelihood that the travel signal governing the traffic flow is changing from a proceed state (e.g., green) to a slow-down state (e.g., amber) or to a stop state (e.g., red). When a traffic flow is stopped but starts to move forward, there is a high likelihood that the travel signal controlling this traffic flow is changing from a stop state (e.g., red) to a proceed state (e.g., green). Similarly, the speed of the traffic flow in another direction other than the facing direction of the vehicle can be used for signal state estimation. For instance, at an intersection where the traffic flow perpendicular to the vehicle's facing direction is moving, there is a high likelihood that the travel signal facing the vehicle is in a stop state (e.g., red).

Signal state estimation may use information about expected state transitions, such as colors or shapes or solidness, or combinations of them. For example, the colors of a travel signal may change in a cyclic sequence: red→green→amber→red, or red→green→red. In some cases, the shape of a travel signal may change in a cyclic sequence: solid circle→arrow→solid circle, or solid circle→square→solid circle. In some implementations, the solidness of a travel signal may change in a cyclic sequence: solid→flashing→solid. Possible transitions may be known from a database or map data or prior images, and they can be treated as part of prior information. In some implementations, knowledge about the possible transitions is not deterministic, so the possible transitions are modeled probabilistically.

Signal state estimation may include temporal filtering. When a travel signal state at an earlier time t−1 has been estimated, the previously estimated state can serve as prior information for estimating the travel signal at a later time t based on Bayesian inference. For example, let $S_{t-1}$ denote a state of a travel signal at time t−1; the state $S_t$ at the time t can be estimated by evaluating a probability $p(S_t|D_t, S_{t-1})$ based on current measured data $D_t$ and the past state $S_{t-1}$. The temporal filtering may comprise a hidden Markov model, which considers one or more of the following: a transition, a correspondence, a place in a travel signal configuration, a traffic flow, and a previously estimated state.

Work Flow

Figure 13:
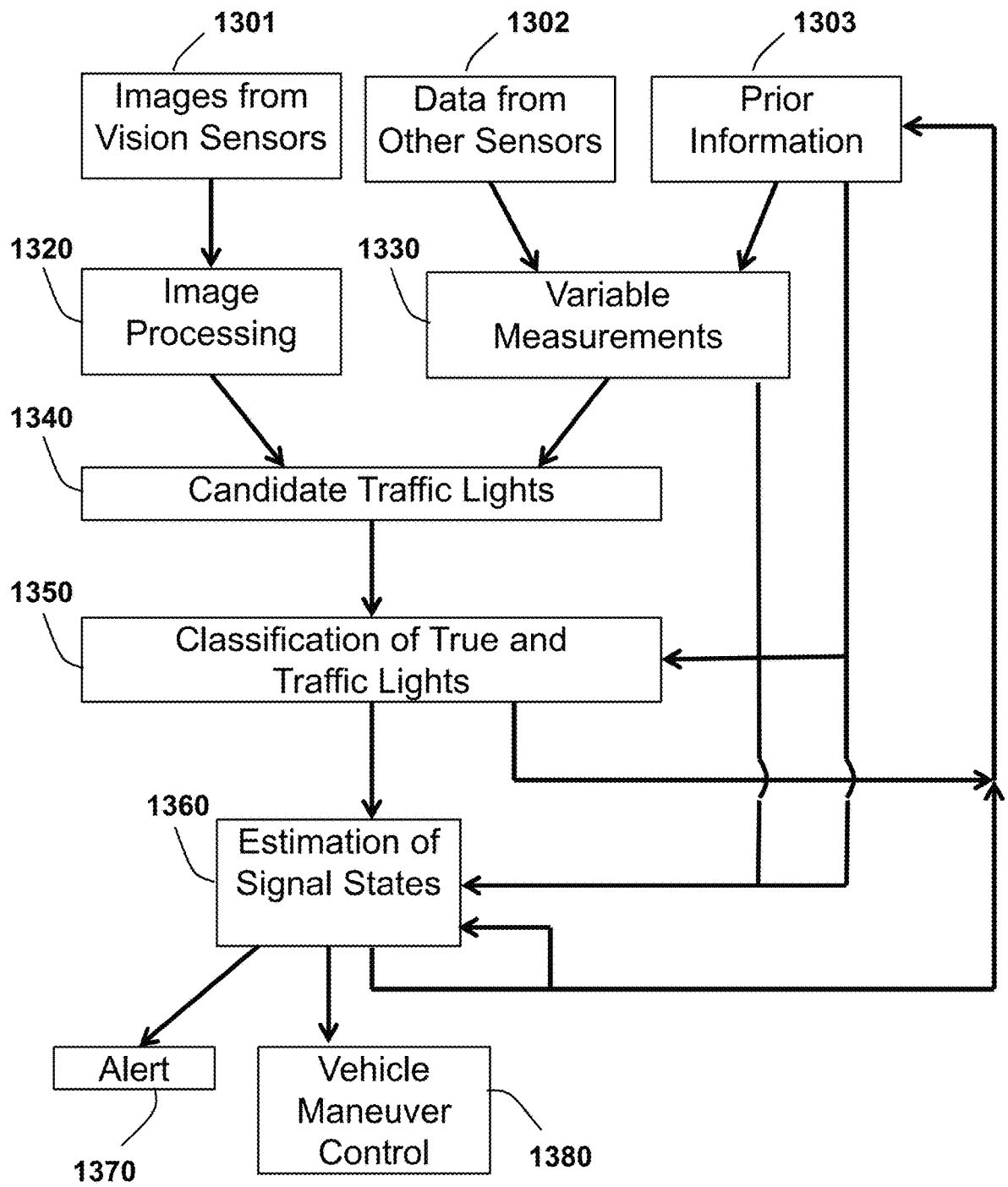
FIG. 13 shows an example of the analysis flow of a travel signal perception system.

FIG. 13 illustrates an exemplary work flow of the technologies described in this document. Images may be acquired from one or more vision sensors 1301, and the image processing 1320 outputs zero, one, or more candidate travel signals 1340. Data may be acquired from other sensors 1302, and prior information 1303 is collected from a data source of previously analyzed results from classification 1350 and estimation 1360. From the sensor data or prior information or both, various measurements 1330 associated with travel signals are collected or computed. Candidate travel signals are classified to be true travel signals 1350 using variable measurements 1330 or prior information 1303 or both. Classified travel signals are processed to estimate their signal states 1360. The signal state estimation may utilize a previously estimated signal state, variable measurements 1330, prior information 1303, or combinations of them.

In some implementations, when a true travel signal has been detected and its signal state is estimated, the technologies may generate an audio alert or a visual alert 1370 or both accordingly. For example, when a stop signal (e.g., red) or a slowing down signal (e.g., amber) is estimated, the alert may be generated to warn an occupant. When a transition condition is determined (e.g., from a stop signal to a proceed signal, or from a proceed signal to a slowing down signal, or from a proceed signal to a stop signal, or from a slowing down signal to a stop signal) in a travel signal, an alert may be generated to warn an occupant to follow the rule of the travel signal.

In some implementations when a vehicle is driving in an autonomous mode or a combined autonomous and human-operated mode, e.g., a human-guided autonomous mode or a machine-assisted manual mode, the technologies may incorporate results of travel signal detection and signal state estimation to control the vehicle's maneuvering 1380 to respond the traffic signal. For example, when a slowing down signal (e.g., amber) or a stop signal (e.g., red) or a proceed signal (e.g., green) is estimated, the technologies may slow down the vehicle or stop the vehicle or permit the vehicle to proceed. When a transition condition is determined for a travel signal (e.g., from a stop signal to a proceed signal, or from a proceed signal to a slowing down signal, or from a proceed signal to a stop signal, or from a slowing down signal to a stop signal), the technologies may control the vehicle to respond to the transition condition accordingly.

Figure 14:
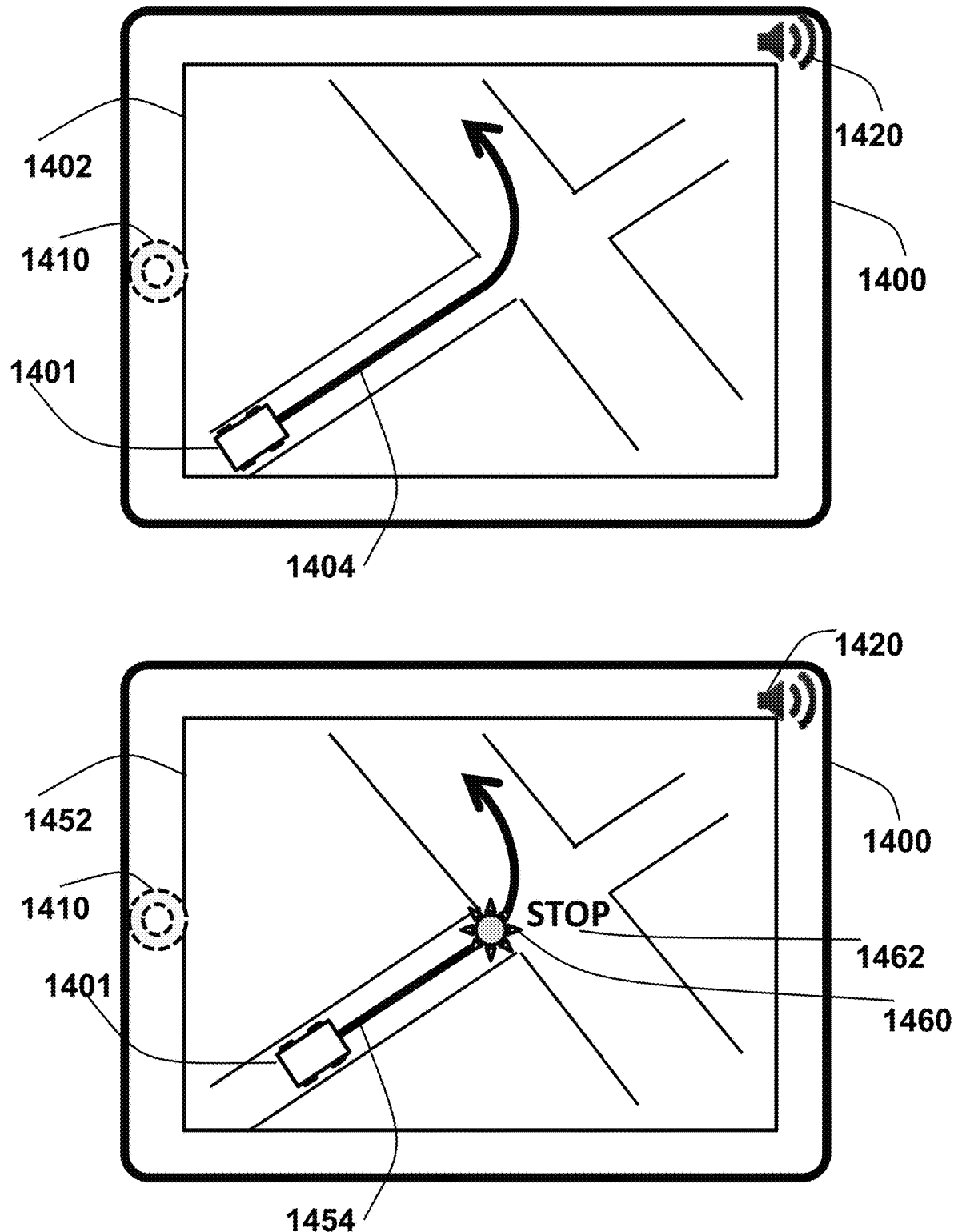
FIG. 14 shows an example of implementations on a mobile device.

Implementations of a travel signal perception system may be based on hardware or software or both. For example, the technologies may be realized by an electronic apparatus in a vehicle system. In some cases, some or all of the features of the travel signal perception system may be incorporated in other devices such as mobile devices associated with drivers or passengers in a vehicle. FIG. 14 shows an exemplary device 1400. The device can be mounted, for example, on the dashboard of a vehicle 1401. The device may comprise, or connect to, a vision sensor (e.g., camera) 1410, which is posed to face the front of the vehicle 1401. The device 1400 may show a map view 1402 that portrays a trajectory 1404 of the vehicle 1401. The device 1400 may continuously perform travel signal perception when it is powered on. When the vehicle 1401 is approaching a travel signal 1460, for example, at an intersection, the device 1400 may update the map view 1452 to show an updated trajectory 1454 and the detected travel signal 1460. The map view 1452 may show a state 1462 (e.g., "STOP") of the travel signal 1460.

In some embodiments, the device may comprise an audio component 1420 (e.g., a speaker). The detected travel signal 1460 may be notified by a sound, for example, "TRAVEL SIGNAL DETECTED." The signal state 1462 may be verbalized in a sound, for example, "STOP THE VEHICLE."

Other implementations are also within the scope of the claims.

The invention claimed is:

1. A method comprising:
   obtaining, using at least one processor, an image of a section of a road in a field of view of a vehicle from one or more sensors associated with the vehicle;
   identifying, using the at least one processor, a travel signal in the image;
   determining, using the at least one processor, whether the travel signal is relevant to a driving decision to be made for the vehicle at a current moment, wherein the determining comprises:
      determining a shape of the travel signal in the image;
      comparing the determined shape to an expected shape of a travel signal in the driving direction of the vehicle; and
      in response to determining that the determined shape corresponds to the expected shape, determining that the travel signal is relevant to the driving decision to be made for the vehicle at the current moment; and
   in response to a determination that the travel signal is relevant to the driving decision to be made for the vehicle at the current moment, determining, using the at least one processor, a signal state of the travel signal.

2. The method of claim 1, wherein determining whether the travel signal is relevant to the driving decision to be made for the vehicle at the current moment comprises:
   measuring a distance between a position of the vehicle on the road and a position of the travel signal;
   comparing the distance to a threshold value; and
   in response to determining that the distance is less than the threshold value, determining that the travel signal is relevant to the driving decision to be made for the vehicle at the current moment.

3. The method of claim 2, wherein measuring the distance comprises:
   determining a size of the travel signal in the image; and
   estimating the distance based at least on the determined size of the travel signal in the image.

4. The method of claim 1, wherein determining whether the travel signal is relevant to the driving decision to be made for the vehicle at the current moment comprises determining whether the travel signal is facing the driving direction of the vehicle.

5. The method of claim 1, further comprising accessing road map data about a current route traveled by the vehicle, the method further comprising:
   identifying one or more travel signals to be next encountered by the vehicle along the current route using the road map data and the current route traveled by the vehicle;
   determining whether the travel signal is one of the identified one or more travel signals; and
   in response to a determination that the travel signal is one of the identified one or more travel signals, determining that the travel signal is relevant to the driving decision to be made for the vehicle at the current moment.

6. The method of claim 1, wherein determining whether the travel signal is relevant to the driving decision to be made for the vehicle at the current moment comprises:
   identifying a shape of the travel signal using the image;
   determining whether the shape of the travel signal is configured to control traffic in the driving direction of the vehicle; and
   in response to determining that the shape of the travel signal is configured to control traffic in the driving direction of the vehicle, determining that the travel signal is relevant to the driving decision to be made for the vehicle at the current moment.

7. The method of claim 1, wherein determining the signal state of the travel signal comprises:
   identifying that the travel signal includes a plurality of color signals in an arrangement using the image;
   detecting that a particular color signal of a plurality of color signals is illuminated in the image;
   determining a position of the particular color signal in the arrangement;
   accessing stored information about positions of color signals in arrangements of travel signals and corresponding signal states; and
   determining the signal state of the travel signal using the position of the particular color signal and the accessed information.

8. The method of claim 1, wherein determining the signal state of the travel signal comprises:
   identifying a color of the travel signal in the image, the color indicating a signal state of the travel signal in the image;
   accessing information about expected state transitions of travel signals; and
   determining a next signal state of the travel signal using the identified color of the travel signal and the accessed information about expected state transitions.

9. A method comprising:
   obtaining, using at least one processor, an image of a section of a road in a field of view of a vehicle from one or more sensors associated with the vehicle;
   analyzing, by the at least one processor, at least a plurality of pixels in the image;
   in response to the analysis, selecting, by the at least one processor, one or more pixels of the plurality of pixels;

determining, by the at least one processor, at least one geometric shape in the selected pixels of the plurality of pixels using edge filtering;

comparing, by the at least one processor, a plurality of characteristics of the at least one geometric shape to known ranges of corresponding travel signal criteria;

for each characteristic of the plurality of characteristics, determining, by the at least one processor, a numeric score by comparing to a known range of a corresponding travel signal criterion;

computing, by the at least one processor, a weighted sum of a plurality of numeric scores determined for the plurality of characteristics; and identifying, by the at least one processor, the at least one geometric shape as a candidate travel signal based at least on the weighted sum.

10. The method of claim 9, wherein analyzing at least the plurality of pixels in the image comprises:

for each pixel of the plurality of pixels:
obtaining at least one color parameter;
comparing the at least one color parameter to threshold values; and
in response to determining that the at least one color parameter satisfies the threshold values, selecting the corresponding pixel.

11. The method of claim 10, wherein the at least one color parameter comprises one of a saturation value or a lightness value, and wherein comparing the at least one color parameter to threshold values comprises:

comparing the saturation value or the lightness value of each pixel to respective upper and lower bounds.

12. The method of claim 10, wherein the at least one color parameter comprises one of a saturation value or a lightness value, and wherein determining that the at least one color parameter satisfies the threshold values comprises:

determining that the saturation value or the lightness value of each pixel is within a range specified by respective upper and lower bounds.

13. The method of claim 9, wherein obtaining the image comprises obtaining the image in an RGB format, and wherein analyzing the plurality of pixels in the image comprises converting the image from the RGB format to a Hue-Saturation-Value (HSV) format.

14. The method of claim 9, wherein the geometric shape comprises a polygon and the travel signal criteria comprises one or more of shape, size or solidness, and wherein identifying the at least one geometric shape as a candidate travel signal comprises at least one of:
determining that a shape of the polygon corresponds to a circle,
determining that a size of the polygon is within a size range specified for travel signals, or
determining that the polygon is solid by determining that it does not include other shapes.

15. The method of claim 9, wherein comparing the one or more characteristics of the at least one geometric shape to known ranges of corresponding travel signal criteria comprises:

comparing the one or more characteristics to predefined templates, wherein the predefined templates are generated using one or more of databases, maps, or previously analyzed data associated with travel signals.

16. An apparatus comprising:
one or more processors associated with a vehicle; and
memory storing instructions that, when executed, are configured to cause the one or more processors to perform operations comprising:
obtaining an image of a section of a road in a field of view of the vehicle from one or more sensors associated with the vehicle;
identifying a travel signal in the image;
determining whether the travel signal is relevant to a driving decision to be made for the vehicle at a current moment, wherein the determining comprises:
determining a shape of the travel signal in the image;
comparing the determined shape to an expected shape of a travel signal in the driving direction of the vehicle; and
in response to determining that the determined shape corresponds to the expected shape, determining that the travel signal is relevant to the driving decision to be made for the vehicle at the current moment; and
in response to a determination that the travel signal is relevant to the driving decision to be made for the vehicle at the current moment, determining a signal state of the travel signal.

17. The apparatus of claim 16, wherein determining whether the travel signal is relevant to the driving decision to be made for the vehicle at the current moment comprises:

measuring a distance between a position of the vehicle on the road and a position of the travel signal;
comparing the distance to a threshold value; and
in response to determining that the distance is less than the threshold value, determining that the travel signal is relevant to the driving decision to be made for the vehicle at the current moment.

18. The apparatus of claim 16, wherein determining whether the travel signal is relevant to the driving decision to be made for the vehicle at the current moment comprises determining whether the travel signal is facing the driving direction of the vehicle.

19. The apparatus of claim 16, further comprising accessing road map data about a current route traveled by the vehicle, the operations further comprising:

identifying one or more travel signals to be next encountered by the vehicle along the current route using the road map data and the current route traveled by the vehicle;
determining whether the travel signal is one of the identified one or more travel signals; and
in response to a determination that the travel signal is one of the identified one or more travel signals, determining that the travel signal is relevant to the driving decision to be made for the vehicle at the current moment.

20. A method comprising:
obtaining, using at least one processor, an image of a section of a road in a field of view of a vehicle from one or more sensors associated with the vehicle;
identifying, using the at least one processor, a travel signal in the image;
determining, using the at least one processor, whether the travel signal is relevant to a driving decision to be made for the vehicle at a current moment, wherein the determining comprises:
determining a size of the travel signal in the image;
estimating a distance between a position of the vehicle on the road and a position of the travel signal based at least on the determined size of the travel signal in the image;
comparing the distance to a threshold value; and
in response to determining that the distance is less than the threshold value, determining that the travel signal is relevant to the driving decision to be made for the vehicle at the current moment; and in response to a determination that the travel signal is relevant to the driving decision to be made for the vehicle at the current moment, determining, using the at least one processor, a signal state of the travel signal.

* * * * *